(12) United States Patent
Ebert

(10) Patent No.: US 10,610,775 B1
(45) Date of Patent: Apr. 7, 2020

(54) ACTUATION FOR A FOCUS ADJUSTING HEAD MOUNTED DISPLAY

(71) Applicant: Facebook Technologies, LLC, Menlo Park, CA (US)

(72) Inventor: Ryan Michael Ebert, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/862,456

(22) Filed: Jan. 4, 2018

Related U.S. Application Data

(60) Provisional application No. 62/442,393, filed on Jan. 4, 2017.

(51) Int. Cl.
| | |
|---|---|
| *G06F 3/01* | (2006.01) |
| *A63F 13/22* | (2014.01) |
| *G02B 27/01* | (2006.01) |
| *G06F 3/147* | (2006.01) |
| *G02B 27/00* | (2006.01) |
| *G06T 19/00* | (2011.01) |

(52) U.S. Cl.
CPC .......... *A63F 13/22* (2014.09); *G02B 27/0093* (2013.01); *G02B 27/0101* (2013.01); *G02B 27/0172* (2013.01); *G06F 3/013* (2013.01); *G06F 3/147* (2013.01); *G06T 19/006* (2013.01); *G02B 2027/0178* (2013.01); *G02B 2027/0187* (2013.01)

(58) Field of Classification Search
CPC . A63F 13/22; G02B 27/0093; G02B 27/0101; G02B 27/0172; G06F 3/013; G06F 3/147; G06T 19/006
See application file for complete search history.

(56) References Cited

U.S. PATENT DOCUMENTS 8,467,133 B2 * 6/2013 Miller .................. G02B 27/017
353/28

FOREIGN PATENT DOCUMENTS

JP          2014-219621     * 11/2014

* cited by examiner

*Primary Examiner* — Towfiq Elahi
(74) *Attorney, Agent, or Firm* — Fenwick & West LLP

(57) ABSTRACT

A head mounted display (HMD) includes an electronic display configured to display a virtual scene to a user, an optics block, an eye tracking system, and a varifocal actuation that mechanically changes a distance between the optics block and the electronic display. The varifocal actuation block is configured to change a focal length of the HMD based on the eye position of the user and includes a motor, a power screw coupled to the actuating motor configured to turn responsive to actuation of the motor, and a nut sled on the power screw that is coupled to the electronic display. The nut sled is configured to move back and forth along a length of the power screw responsive to the power screw being turned by the motor that results in movement of the electronic display relative to the optics block.

19 Claims, 20 Drawing Sheets

(Frame n)

(Frame n+1)

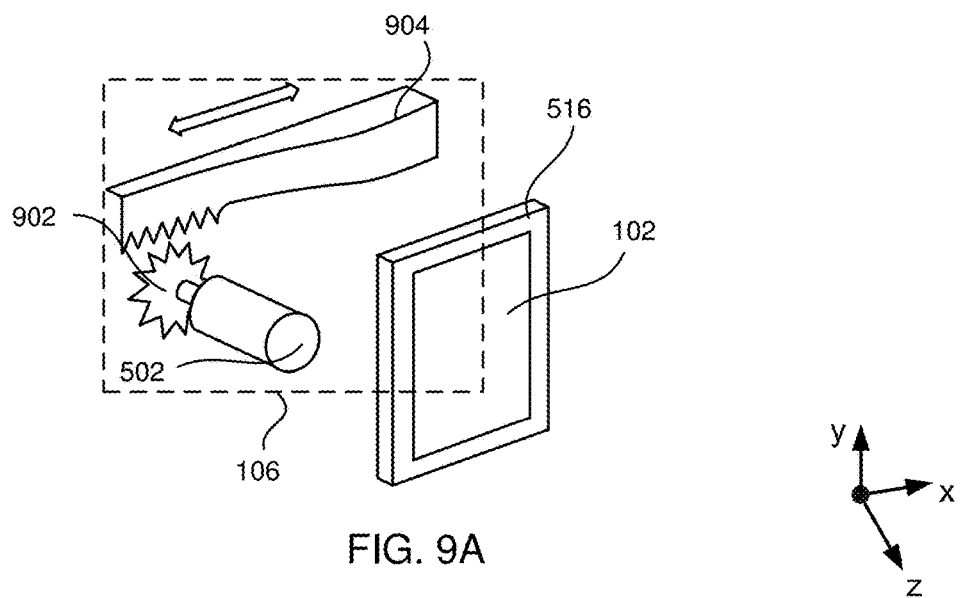
FIG. 9A
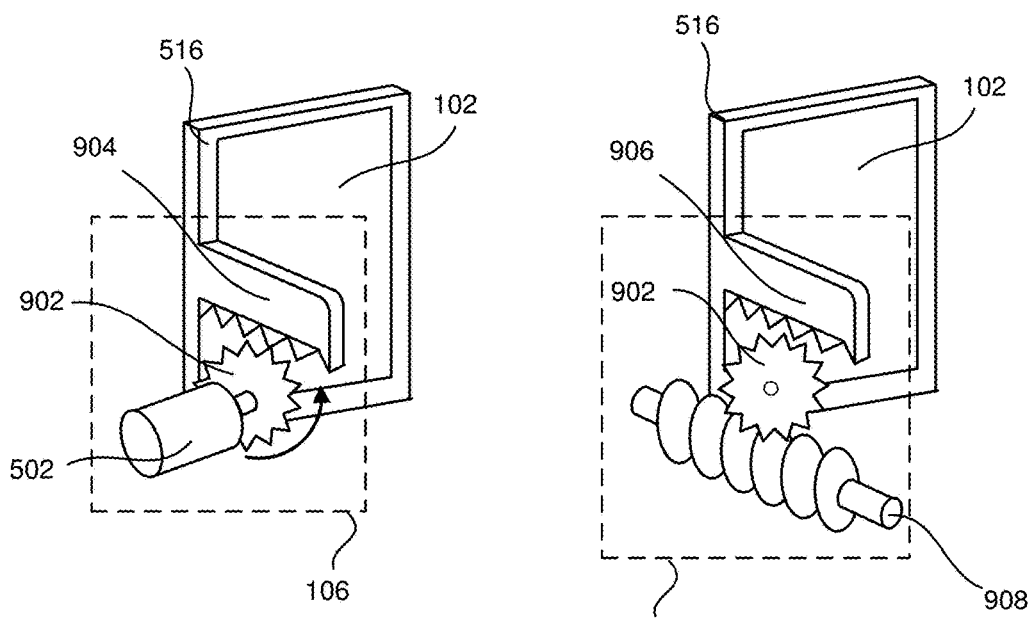
FIG. 9B
FIG. 9C

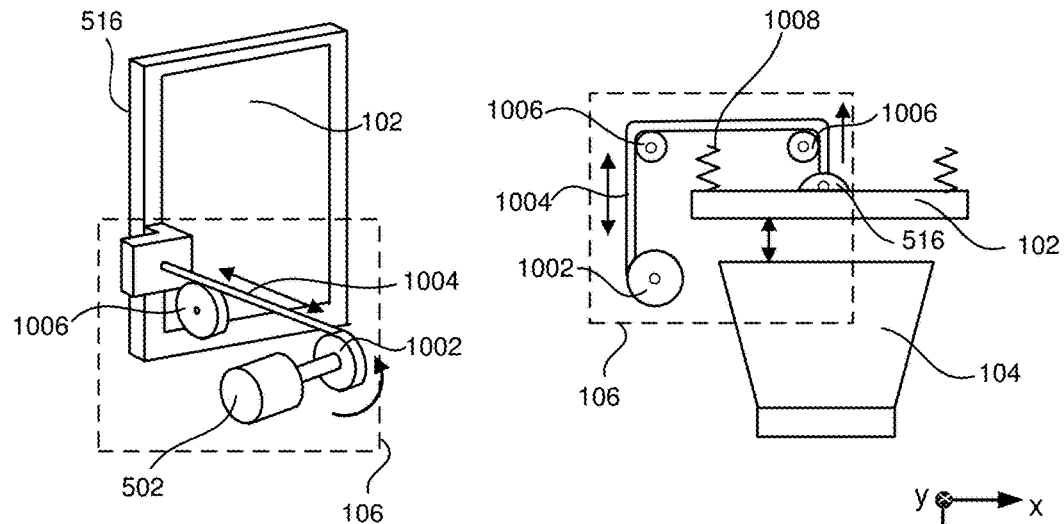
FIG. 10A
FIG. 10B
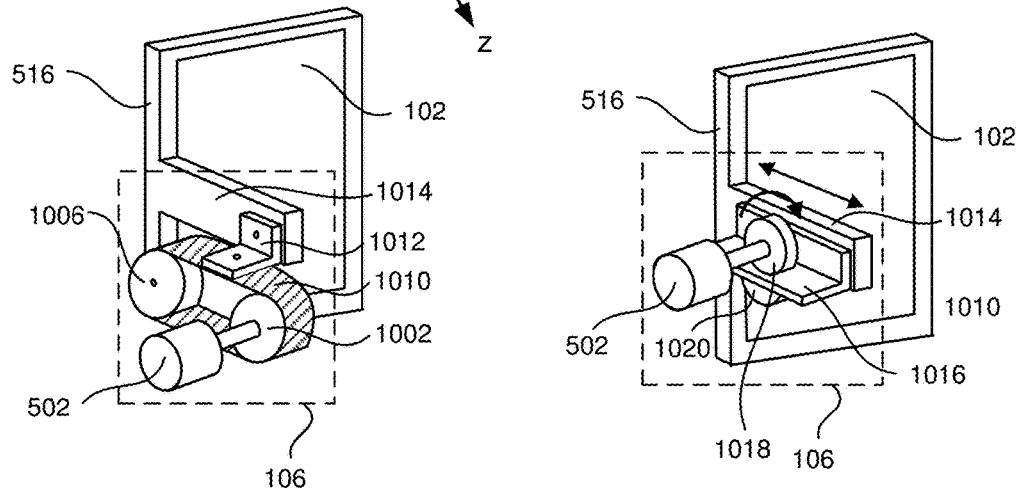
FIG. 10C
FIG. 10D

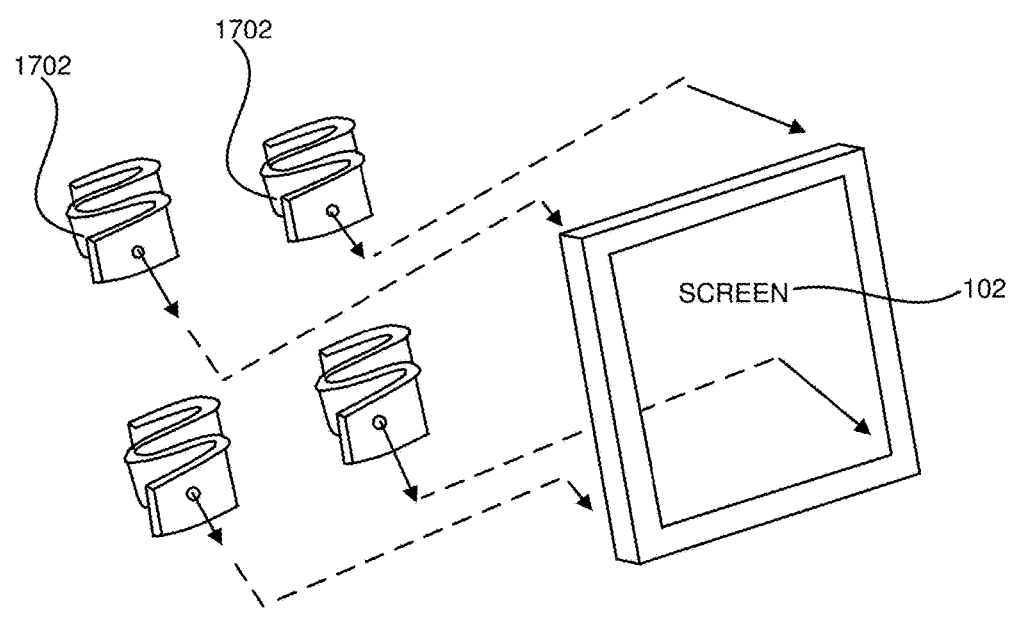
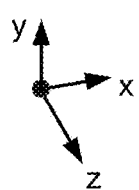
FIG. 17A

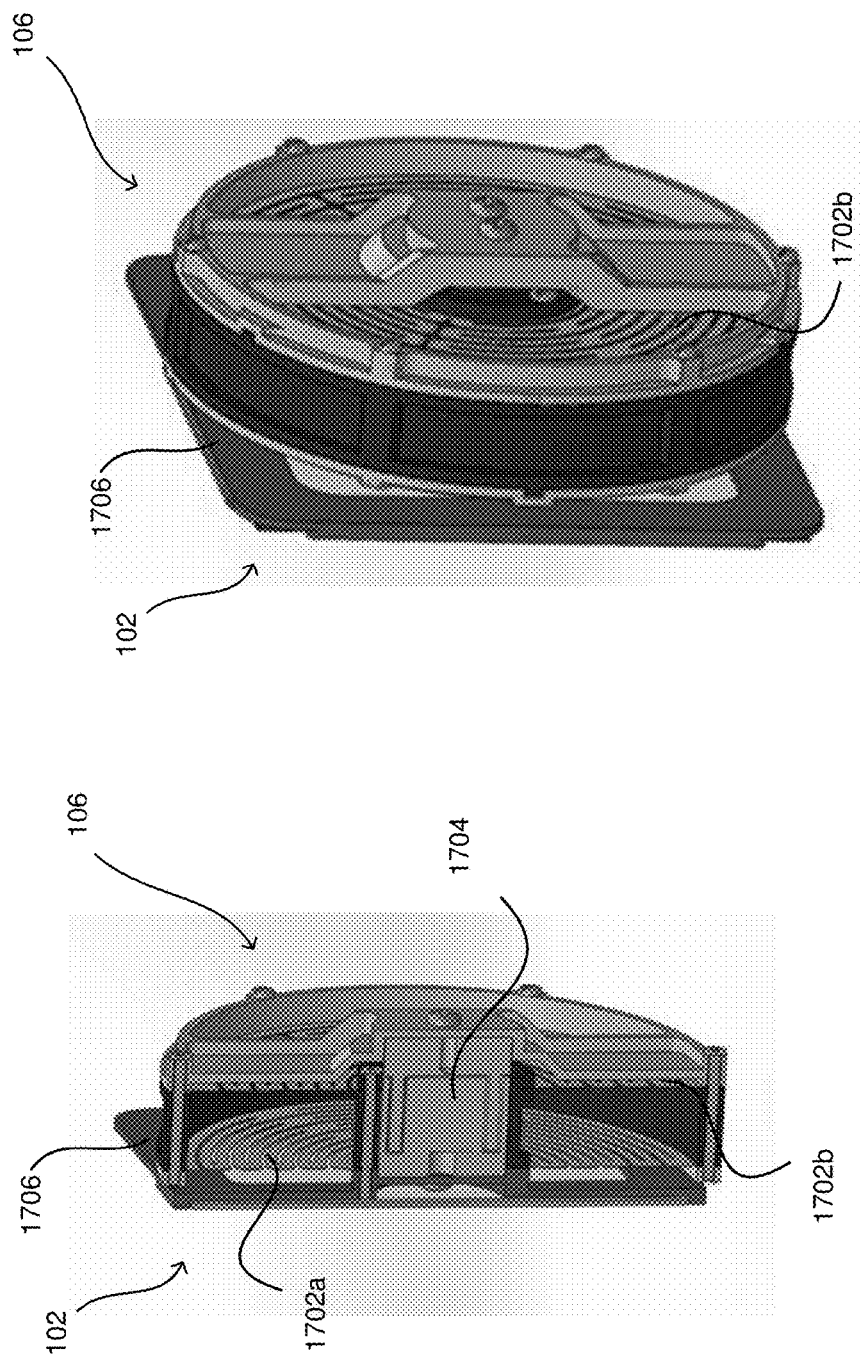

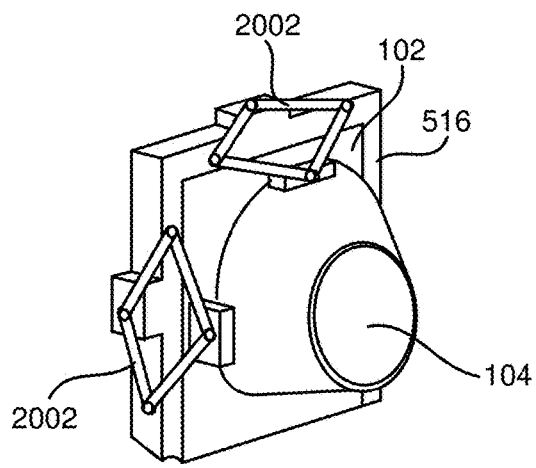
FIG. 20
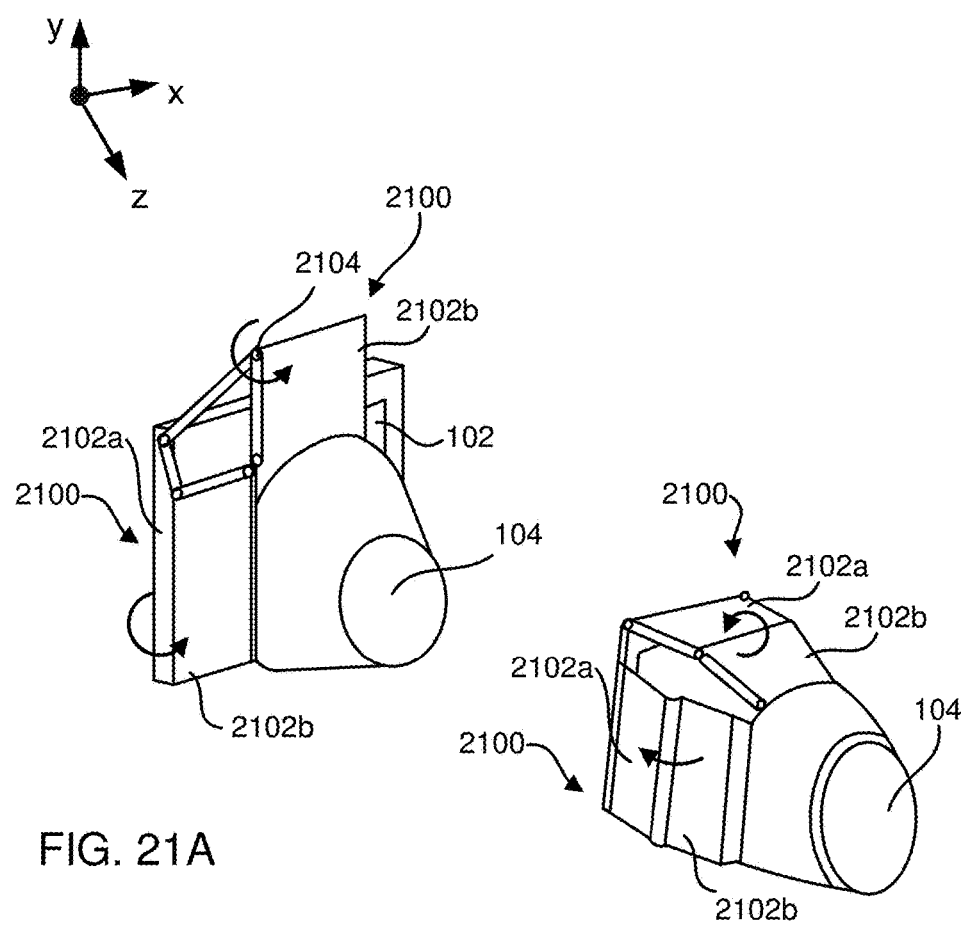
FIG. 21A
FIG. 21B

ACTUATION FOR A FOCUS ADJUSTING HEAD MOUNTED DISPLAY

CROSS-REFERENCE TO RELATED APPLICATIONS

This application claims the benefit of U.S. Application No. 62/442,393, filed Jan. 4, 2017, which is incorporated by reference in their entirety.

BACKGROUND

The present disclosure generally relates to enhancing images from electronic displays, and specifically to a mechanism for varying the focal length of optics to enhance the images.

A head mounted display (HMD) can be used to simulate virtual environments. For example, stereoscopic images are be displayed on an electronic display inside the HMD to simulate the illusion of depth and head tracking sensors estimate what portion of the virtual environment is being viewed by the user. However, conventional HMDs are often unable to compensate for vergence and accommodation conflicts when rendering content, which may cause visual fatigue and nausea in users.

SUMMARY

A head mounted display (HMD) includes an electronic display screen configured to display a virtual scene to a user wearing the HMD, an optics block that directs image light from the electronic display towards an eye of a user, an eye tracking system configured to determine an eye position of the user, and a varifocal actuation block (e.g., an element that mechanically changes a distance between a lens system in the optics block and the electronic display element). The varifocal actuation block, in various embodiments, automatically adjust the focus of the optics block. For example, a three-dimensional (3D) virtual scene is presented on an electronic display screen of the HMD and a focal length of the optics block that directs image light from the electronic display towards eyes of the user is adjusted using a varifocal actuation block based on a location or object within the virtual scene where the user is looking. The eye tracking system includes an infrared camera and a mirror positioned at an angle in optical series with the one or more lenses of the optics block and the electronic display screen to reflect infrared light from an eye of a user wearing the HMD to the infrared camera.

The varifocal actuation block is configured to change a focal length of the optics block based on the eye position of the user and includes an actuating motor, a power screw coupled to the actuating motor that is configured to turn in response to actuation of the actuating motor, and a nut sled on the power screw that is coupled to the electronic display screen. The nut sled is configured to move back and forth along a length of the power screw in response to the power screw being turned by the actuating motor that results in movement of the electronic display screen relative to the optics block.

An encoder, in communication with the eye tracking system and the varifocal actuation block, receives the eye position determined by the eye tracking system, determines the focal length of the optics block that provides focus for the eye position, and provides an instruction to the varifocal actuation block to move the electronic display screen to a position providing focus for the eye position determined by the eye tracking system.

The optics block, in one embodiment, is fixed to a housing of the HMD and the varifocal actuation block moves the electronic display screen relative to the optics block along an optical axis of the optics block and the electronic display screen moves relative to the optics block along the optical axis of the optics block via guide pins attached to the electronic display screen where a male end of each guide pin couples with a female end of a corresponding guide pin fixed to the optics block. Additionally, a bracket holding the motor and the power screw is mounted to the housing of the HMD and the nut sled on the power screw coupled to the electronic display screen moves the electronic display screen relative to the optics block to change the focal length for a user viewing content displayed on the electronic display screen at an exit pupil of the HMD.

The infrared camera, in one embodiment, is located off-axis at an angle relative to optical axis and the hot mirror is positioned at an angle to reflect the infrared light from the eye of the user wearing the HMD to the infrared camera off-axis. Thus, the hot mirror is transparent to visible light to allow the light from electronic display to pass through to the user unimpeded while reflecting the IR light with the position of the eye of the user to infrared camera. The infrared camera, in one embodiment, captures infrared light reflected from a retina of the eye of the user and the eye tracking system determines the position of the eye of the user using the infrared light reflected from the retina. The encoder then uses the position of the eye to determine a vergence depth corresponding to a virtual depth in the virtual scene at which the eyes of the user are focused.

BRIEF DESCRIPTION OF DRAWINGS

FIG. 9A shows an example portion of a head mounted display that includes a varifocal actuation block using a rolling or sliding CAM contact surfaces to induce translation of an electronic display relative to an optics block, in one embodiment.

FIGS. 9B-9C show example portions of a head mounted display that includes a varifocal actuation block using a gear and rack implementation, in various embodiments.

FIGS. 10A-10D show example portions of a head mounted display that includes a varifocal actuation block using a cable or belt drive with one or more pulleys, and a friction drive wheel in various embodiments.

FIG. 17A shows an example portion of a head mounted display that includes a varifocal actuation block using a Flexure based guidance method, in one embodiment.

FIG. 17B shows a side cut view of a varifocal actuation block using another Flexure based guidance method, in one embodiment.

FIG. 17C shows a perspective view of a varifocal actuation block using the Flexure based guidance method of FIG. 17B.

FIG. 20 shows an example portion of a head mounted display that includes a varifocal actuation block using a scissor linkage method, in one embodiment.

FIGS. 21A-21B shows an example portion of a head mounted display that includes a varifocal actuation block using Sarrus linkage guidance method, in various embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Varifocal Actuation Overview

A varifocal system provides dynamic adjustment of the focal distance of a head mounted display (HMD) to keep a user's eyes in a zone of comfort as vergence and accommodation change. The system uses an eye tracker to determine a vergence depth corresponding to where the user is looking and adjusts the focus to ensure image is in focus at the determined focal plane. The system, in one implementation, physically changes the distance between an electronic display and optical block of the HMD by moving the electronic display, optical block, or both using various actuation devices, guidance system, and encoder mechanisms described herein.

System Overview

Figure 1:
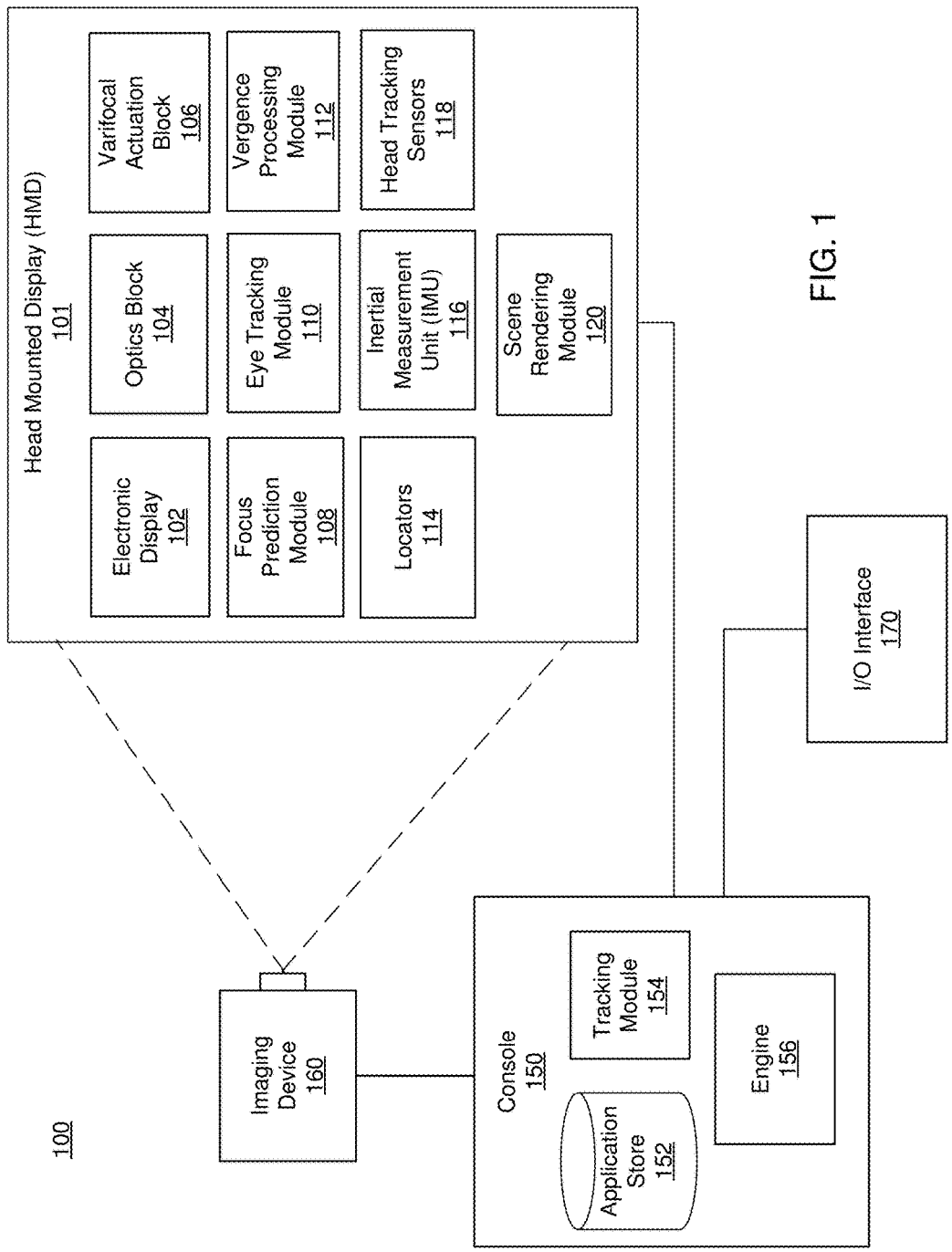
FIG. 1 shows an example virtual reality system, in accordance with at least one embodiment.

FIG. 1 shows varifocal system 100 in which a head-mounted display (HMD) 101 operates. Varifocal system 100 may be for use as a virtual reality (VR) system, an augmented reality (AR) system, a mixed reality (MR) system, or some combination thereof. In this example, the varifocal system 100 includes HMD 101, imaging device 160, and I/O interface 170, which are each coupled to console 150. While FIG. 1 shows a single HMD 101, a single imaging device 160, and a single I/O interface 170, in other embodiments, any number of these components may be included in the system. For example, there may be multiple HMDs each having an associated I/O interface 170 and being monitored by one or more imaging devices 160, with each HMD 101, I/O interface 170, and imaging devices 160 communicating with the console 150. In alternative configurations, different and/or additional components may also be included in the system environment.

HMD 101 presents content to a user. Example content includes images, video, audio, or some combination thereof. Audio content may be presented via a separate device (e.g., speakers and/or headphones) external to HMD 101 that receives audio information from HMD 101, console 150, or both. HMD 101 includes electronic display 102, optics block 104, varifocal actuation block 106, focus prediction module 108, eye tracking module 110, vergence processing module 112, one or more locators 114, internal measurement unit (IMU) 116, head tracking sensors 118, and scene rendering module 120.

Optics block 104 directs light from electronic display 102 to an exit pupil for viewing by a user using one or more optical elements, such as apertures, Fresnel lenses, convex lenses, concave lenses, filters, and so forth, and may include combinations of different optical elements. In some embodiments, one or more optical elements in optics block 104 may have one or more coatings, such as anti-reflective coatings. Magnification of the image light by optics block 104 allows electronic display 102 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view.

Optics block 104 may be designed to correct one or more optical errors. Examples of optical errors include: barrel distortion, pincushion distortion, longitudinal chromatic aberration, transverse chromatic aberration, spherical aberration, comatic aberration, field curvature, astigmatism, and so forth. In some embodiments, content provided to electronic display 102 for display is pre-distorted, and optics block 104 corrects the distortion when it receives image light from electronic display 102 generated based on the content.

Varifocal actuation block 106 includes a varifocal actuation block that causes optics block 104 to vary the focal distance of HMD 101 to keep a user's eyes in a zone of comfort as vergence and accommodation change. In one embodiment, varifocal actuation block 106 physically changes the distance between electronic display 102 and optical block 104 by moving electronic display 102 or optical block 104 (or both), as will be explained further with respect to FIGS. 4A-21B. Additionally, moving or translating two lenses relative to each other may also be used to change the focal distance of HMD 101. Thus, varifocal actuation block 106 may include actuators or motors that move electronic display 102 and/or optical block 104 to change the distance between them. Varifocal actuation block 106 may be separate from or integrated into optics block 104 in various embodiments.

Each state of optics block 104 corresponds to a focal distance of HMD 101 or to a combination of the focal distance and eye position relative to optics block 104 (as discussed further below). In operation, optics block 104 may move in a range of ~5-10 mm with a positional accuracy of ~5-10 μm for a granularity of around 1000 focal distances, corresponding to 1000 states of optics block 104. Any number of states could be provided; however, a limited number of states accommodate the sensitivity of the human eye, allowing some embodiments to include fewer focal distances. For example, a first state corresponds to a focal distance of a theoretical infinity meters (0 diopter), a second state corresponds to a focal distance of 2.0 meters (0.5 diopter), a third state corresponds to a focal distance of 1.0 meters (1 diopter), a fourth state corresponds to a focal distance of 0.5 meters (1 diopter), a fifth state corresponds to a focal distance of 0.333 meters (3 diopter), and a sixth state corresponds to a focal distance of 0.250 meters (4 diopter). Varifocal actuation block 106, thus, sets and changes the state of optics block 104 to achieve a desired focal distance.

Focus prediction module 108 is an encoder including logic that tracks the position or state of optics block 104 to predict to one or more future states or locations of optics block 104. For example, focus prediction module 108 accumulates historical information corresponding to previous states of optics block 104 and predicts a future state of optics block 104 based on the previous states. Because rendering of a virtual scene by HMD 101 is adjusted based on the state of optics block 104, the predicted state allows scene rendering module 120, further described below, to determine an adjustment to apply to the virtual scene for a particular frame. Accordingly, focus prediction module 108 communicates information describing a predicted state of optics block 104 for a frame to scene rendering module 120. Adjustments for the different states of optics block 104 performed by scene rendering module 120 are further described below.

Eye tracking module 110 tracks an eye position and eye movement of a user of HMD 101. A camera or other optical sensor inside HMD 101 captures image information of a user's eyes, and eye tracking module 110 uses the captured information to determine interpupillary distance, interocular distance, a three-dimensional (3D) position of each eye relative to HMD 101 (e.g., for distortion adjustment purposes), including a magnitude of torsion and rotation (i.e., roll, pitch, and yaw) and gaze directions for each eye. In one example, infrared light is emitted within HMD 101 and reflected from each eye. The reflected light is received or detected by the camera and analyzed to extract eye rotation from changes in the infrared light reflected by each eye. Many methods for tracking the eyes of a user can be used by eye tracking module 110. Accordingly, eye tracking module 110 may track up to six degrees of freedom of each eye (i.e., 3D position, roll, pitch, and yaw) and at least a subset of the tracked quantities may be combined from two eyes of a user to estimate a gaze point (i.e., a 3D location or position in the virtual scene where the user is looking). For example, eye tracking module 110 integrates information from past measurements, measurements identifying a position of a user's head, and 3D information describing a scene presented by electronic display element 102. Thus, information for the position and orientation of the user's eyes is used to determine the gaze point in a virtual scene presented by HMD 101 where the user is looking.

Further, distance between a pupil and optics block 104 changes as the eye moves to look in different directions. The varying distance between pupil and optics block 104 as viewing direction changes is referred to as "pupil swim" and contributes to distortion perceived by the user as a result of light focusing in different locations as the distance between pupil and optics block 104. Accordingly, measuring distortion a different eye positions and pupil distances relative to optics block 104 and generating distortion corrections for different positions and distances allows mitigation of distortion caused by "pupil swim" by tracking the 3D position of a user's eyes and applying a distortion correction corresponding to the 3D position of each of the user's eye at a given point in time. Thus, knowing the 3D position of each of a user's eyes allows for the mitigation of distortion caused by changes in the distance between the pupil of the eye and optics block 104 by applying a distortion correction for each 3D eye position.

Vergence processing module 112 determines a vergence depth of a user's gaze based on the gaze point or an estimated intersection of the gaze lines determined by eye tracking module 110. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, vergence processing module 112 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused and a depth from the user's eyes at which the eyes are focused, thereby, providing information, such as an object or plane of focus, for rendering adjustments to the virtual scene.

In some embodiments, rather than provide accommodation for the eye at a determined vergence depth, accommodation may be directly determined by a wavefront sensor, such as a Shack-Hartmann wavefront sensor; hence, a state of optics block 104 may be a function of the vergence or accommodation depth and the 3D position of each eye, so optics block 104 brings objects in a scene presented by electronic display element 102 into focus for a user viewing the scene. Further, vergence and accommodation information may be combined to focus optics block 104 and to render synthetic depth of field blur.

Locators 114 are objects located in specific positions on HMD 101 relative to one another and relative to a specific reference point on HMD 101. Locator 114 may be a light emitting diode (LED), a corner cube reflector, a reflective marker, a type of light source that contrasts with an environment in which HMD 101 operates, or some combination thereof. Active locators 114 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

Locators 114 can be located beneath an outer surface of HMD 101, which is transparent to the wavelengths of light emitted or reflected by locators 114 or is thin enough not to substantially attenuate the wavelengths of light emitted or reflected by locators 114. Further, the outer surface or other portions of HMD 101 can be opaque in the visible band of wavelengths of light. Thus, locators 114 may emit light in the IR band while under an outer surface of HMD 101 that is transparent in the IR band but opaque in the visible band.

IMU 116 is an electronic device that generates fast calibration data based on measurement signals received from one or more of head tracking sensors 118, which generate one or more measurement signals in response to motion of HMD 101. Examples of head tracking sensors 118 include accelerometers, gyroscopes, magnetometers, other sensors suitable for detecting motion, correcting error associated with IMU 116, or some combination thereof. Head tracking sensors 118 may be located external to IMU 116, internal to IMU 116, or some combination thereof.

Based on the measurement signals from head tracking sensors 118, IMU 116 generates fast calibration data indicating an estimated position of HMD 101 relative to an initial position of HMD 101. For example, head tracking sensors 118 include multiple accelerometers to measure translational motion (forward/back, up/down, left/right) and multiple gyroscopes to measure rotational motion (e.g., pitch, yaw, and roll). IMU 116 can, for example, rapidly sample the measurement signals and calculate the estimated position of HMD 101 from the sampled data. For example, IMU 116 integrates measurement signals received from the accelerometers over time to estimate a velocity vector and integrates the velocity vector over time to determine an estimated position of a reference point on HMD 101. The reference point is a point that may be used to describe the position of HMD 101. While the reference point may generally be defined as a point in space, in various embodiments, reference point is defined as a point within HMD 101 (e.g., a center of the IMU 130). Alternatively, IMU 116 provides the sampled measurement signals to console 150, which determines the fast calibration data.

IMU 116 can additionally receive one or more calibration parameters from console 150. As further discussed below, the one or more calibration parameters are used to maintain tracking of HMD 101. Based on a received calibration parameter, IMU 116 may adjust one or more IMU parameters (e.g., sample rate). In some embodiments, certain calibration parameters cause IMU 116 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

Scene render module 120 receives content for the virtual scene from engine 156 and provides the content for display on electronic display 102. Additionally, scene render module 120 can adjust the content based on information from focus prediction module 108, vergence processing module 112, IMU 116, and head tracking sensors 118. For example, upon receiving the content from engine 156, scene render module 120 adjusts the content based on the predicted state (i.e., eye position and focal distance) of optics block 104 received from focus prediction module 108 by adding a correction or pre-distortion into rendering of the virtual scene to compensate or correct for the distortion caused by the predicted state of optics block 104. Scene render module 120 may also add depth of field blur based on the user's gaze, vergence depth (or accommodation depth) received from vergence processing module 112, or measured properties of the user's eye (e.g., 3D position of the eye, etc.). Additionally, scene render module 120 determines a portion of the content to be displayed on electronic display 102 based on one or more of tracking module 154, head tracking sensors 118, or IMU 116, as described further below.

Imaging device 160 generates slow calibration data in accordance with calibration parameters received from console 150. Slow calibration data includes one or more images showing observed positions of locators 114 that are detectable by imaging device 160. Imaging device 160 may include one or more cameras, one or more video cameras, other devices capable of capturing images including one or more locators 114, or some combination thereof. Additionally, imaging device 160 may include one or more filters (e.g., for increasing signal to noise ratio). Imaging device 160 is configured to detect light emitted or reflected from locators 114 in a field of view of imaging device 160. In embodiments where locators 114 include passive elements (e.g., a retroreflector), imaging device 160 may include a light source that illuminates some or all of locators 114, which retro-reflect the light towards the light source in imaging device 160. Slow calibration data is communicated from imaging device 160 to console 150, and imaging device 160 receives one or more calibration parameters from console 150 to adjust one or more imaging parameters (e.g., focal distance, focus, frame rate, ISO, sensor temperature, shutter speed, aperture, etc.).

I/O interface 170 is a device that allows a user to send action requests to console 150. An action request is a request to perform a particular action. For example, an action request may be to start or end an application or to perform a particular action within the application. I/O interface 170 may include one or more input devices. Example input devices include a keyboard, a mouse, a game controller, or any other suitable device for receiving action requests and communicating the received action requests to console 150. An action request received by I/O interface 170 is communicated to console 150, which performs an action corresponding to the action request. In some embodiments, I/O interface 170 may provide haptic feedback to the user in accordance with instructions received from console 150. For example, haptic feedback is provided by the I/O interface 170 when an action request is received, or console 150 communicates instructions to I/O interface 170 causing I/O interface 170 to generate haptic feedback when console 150 performs an action.

Console 150 provides content to HMD 101 for presentation to the user in accordance with information received from imaging device 160, HMD 101, or I/O interface 170. In the example shown in FIG. 1, console 150 includes application store 152, tracking module 154, and engine 156. Some embodiments of console 150 have different or additional modules than those described in conjunction with FIG. 1. Similarly, the functions further described below may be distributed among components of console 150 in a different manner than is described here.

Application store 152 stores one or more applications for execution by console 150. An application is a group of instructions, that when executed by a processor, generates content for presentation to the user. Content generated by an application may be in response to inputs received from the user via movement of HMD 101 or interface device 170. Examples of applications include gaming applications, conferencing applications, video playback application, or other suitable applications.

Tracking module 154 calibrates system 100 using one or more calibration parameters and may adjust one or more calibration parameters to reduce error in determining position of HMD 101. For example, tracking module 154 adjusts the focus of imaging device 160 to obtain a more accurate position for observed locators 114 on HMD 101. Moreover, calibration performed by tracking module 154 also accounts for information received from IMU 116. Additionally, if tracking of HMD 101 is lost (e.g., imaging device 160 loses line of sight of at least a threshold number of locators 114), tracking module 154 re-calibrates some or all of the system components.

Additionally, tracking module 154 tracks the movement of HMD 101 using slow calibration information from imaging device 160 and determines positions of a reference point on HMD 101 using observed locators from the slow calibration information and a model of HMD 101. Tracking module 154 also determines positions of the reference point on HMD 101 using position information from the fast calibration information from IMU 116 on HMD 101. Additionally, tracking module 154 may use portions of the fast calibration information, the slow calibration information, or some combination thereof, to predict a future location of HMD 101, which is provided to engine 156.

Engine 156 executes applications within the system and receives position information, acceleration information, velocity information, predicted future positions, or some combination thereof for HMD 101 from tracking module 154. Based on the received information, engine 156 determines content to provide to HMD 101 for presentation to the user, such as a virtual scene. For example, if the received information indicates that the user has looked to the left, engine 156 generates content for HMD 101 that mirrors or tracks the user's movement in a virtual environment. Additionally, engine 156 performs an action within an application executing on console 150 in response to an action request received from the I/O interface 170 and provides feedback to the user that the action was performed. The provided feedback may be visual or audible feedback via HMD 101 or haptic feedback via I/O interface 170.

Figure 2:
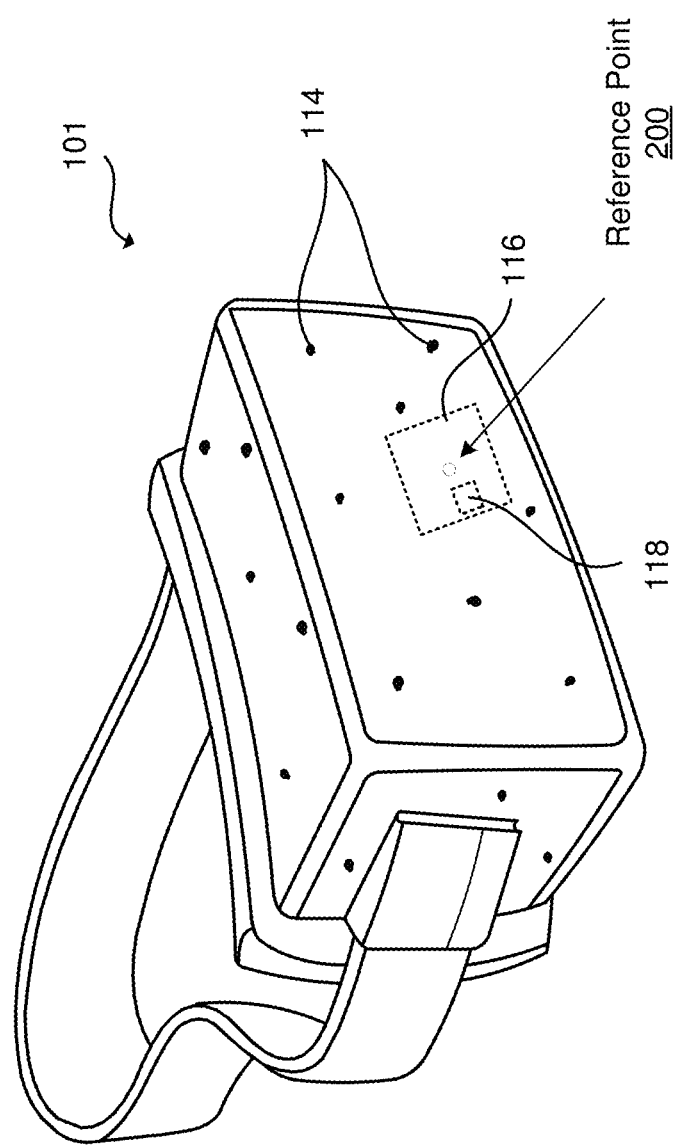
FIG. 2 shows a diagram of a head mounted display, in accordance with at least one embodiment.

FIG. 2 is a diagram of HMD 101, in accordance with at least one embodiment. In this example, HMD 101 includes a front rigid body and a band that goes around a user's head. The front rigid body includes one or more electronic display elements corresponding to electronic display 102, IMU 116, head tracking sensors 118, and locators 114. In this example, head tracking sensors 118 are located within IMU 116. Note in embodiments, where the HMD 101 is used in AR and/or MR applications portions of the HMD 101 may be at least partially transparent (e.g., an internal electronic display, one or more sides of the HMD 101, etc.).

Locators 114 are located in fixed positions on the front rigid body relative to one another and relative to reference point 200. In this example, reference point 200 is located at the center of IMU 116. Each of locators 114 emits light that is detectable by imaging device 160. Locators 114, or portions of locators 114, are located on a front side, a top side, a bottom side, a right side, and a left side of the front rigid body, as shown FIG. 2.

Focus Adjustment Method

As discussed above, varifocal system 100 may dynamically vary the focus depth to bring images presented to a user wearing HMD 101 into focus, which keeps the user's eyes in a zone of comfort as vergence and accommodation change. Additionally, eye tracking in combination with the variable focus of the varifocal system allows blurring to be introduced as depth cues in images presented by HMD 101.

Accordingly, a position, orientation, and/or a movement of HMD 101 is determined by a combination of locators 114, IMU 116, head tracking sensors 118, imagining device 160, and tracking module 154, as described above in conjunction with FIG. 1. Portions of a virtual scene presented by HMD 101 are mapped to various positions and orientations of HMD 101. Thus, a portion of the virtual scene currently viewed by a user is determined based on the position, orientation, and movement of HMD 101. After determining the portion of the virtual scene being viewed by the user, the system may then determine a location or an object within the determined portion at which the user is looking to adjust focus for that location or object accordingly.

Figure 3:
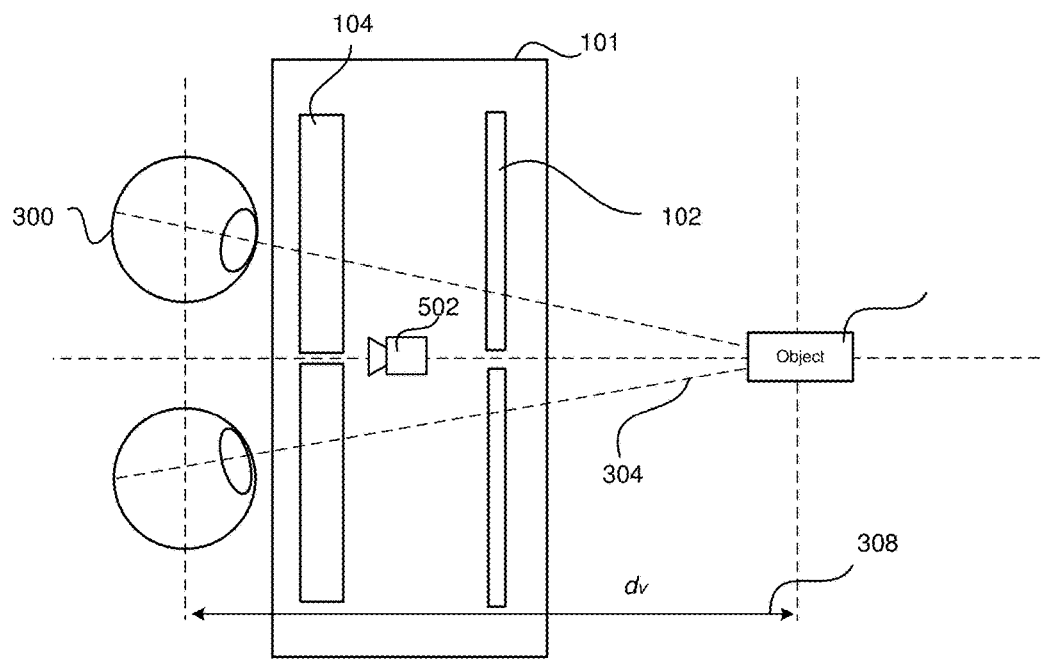
FIG. 3 shows a cross section of a head mounted display including a camera for tracking eye position, in accordance with at least one embodiment.

To determine the location or object within the determined portion of the virtual scene at which the user is looking, HMD 101 tracks the position and location of the user's eyes. Thus, HMD 101 determines an eye position for each eye of the user. For example, HMD 101 tracks at least a subset of the 3D position, roll, pitch, and yaw of each eye and uses these quantities to estimate a 3D gaze point of each eye. Further, information from past eye positions, information describing a position of the user's head, and information describing a scene presented to the user may also be used to estimate the 3D gaze point of an eye in various embodiments. For example, FIG. 3 shows a cross section of an embodiment of HMD 101 that includes camera 302 for tracking the position of each eye 300. In this example, camera 302 captures images of the user's eyes and eye tracking module 110 determines an output for each eye 300 and gaze lines 304 corresponding to the gaze point or location where the user is looking based on the captured images.

A Vergence depth ($d_v$) 308 of the gaze point for the user is determined based on an estimated intersection of gaze lines 304. As shown in FIG. 3, gaze lines 304 converge or intersect at $d_v$ 308, where object 306 is located. Because virtual distances within the virtual scene are known to the system, the vergence depth 308 can be filtered or verified to determine a more accurate vergence depth for the virtual scene. For example, vergence depth 308 is an approximation of the intersection of gaze lines 304, which are themselves an approximation based on the position of a user's eyes 300. Gaze lines 304 do not always appear to accurately intersect. Thus, in one embodiment, virtual distances within the virtual scene can be compared to the vergence depth for the portion of the virtual scene to generate a filtered vergence depth.

Determining a more accurate vergence depth or gaze point enables the virtual scene to more accurately determine a user's object or plane of focus, allowing scene rendering module 120 to add depth of field blur to proper depths and/or objects in the virtual scene or otherwise modify to virtual scene to appear more realistic. Further, if virtual scene includes multiple objects, the vergence processing module 112 may compare the estimated vergence depth to distances associated with at least a subset of the objects. In one example, the minimum difference between distance to an object and the estimated vergence depth is determined to be the filtered vergence depth; however, other methods of identifying an object that specifies the filtered vergence depth may be used in various embodiments.

A state of optics block 104 is determined for a frame of the virtual scene based on states of optics block 140 during presentation of previous frames of the virtual scene. For example, focus prediction module 108 tracks the state of optics block 104 for various frames of the virtual scene to predict to future a state of optics block 104 for subsequent frames of the virtual scene. The predicted state of optics block 104 (e.g., a predicted location of optics block 104) allows the scene rendering module 114 to determine an adjustment to apply to a frame of the virtual scene so distortion caused by the predicted state of optics block 104 corrects or cancels the applied adjustment rather than distorting the frame. Thus, based on the state of optics block 104, a distortion correction is determined for application to a frame of the virtual scene to correct optical error introduced by the state of optics block 104.

Figure 4A:
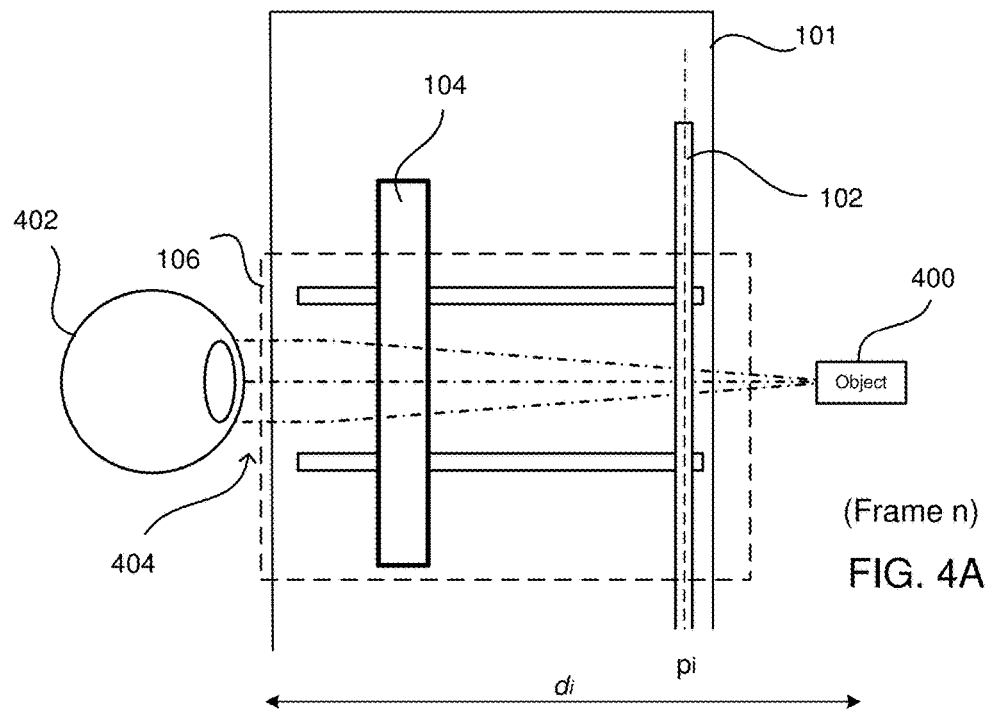
FIGS. 4A and 4B show an example process for adjusting the focal distance of a head mounted display by varying the distance between a display screen and the optics block using a varifocal actuation block, in accordance with at least one embodiment.
Figure 4B:
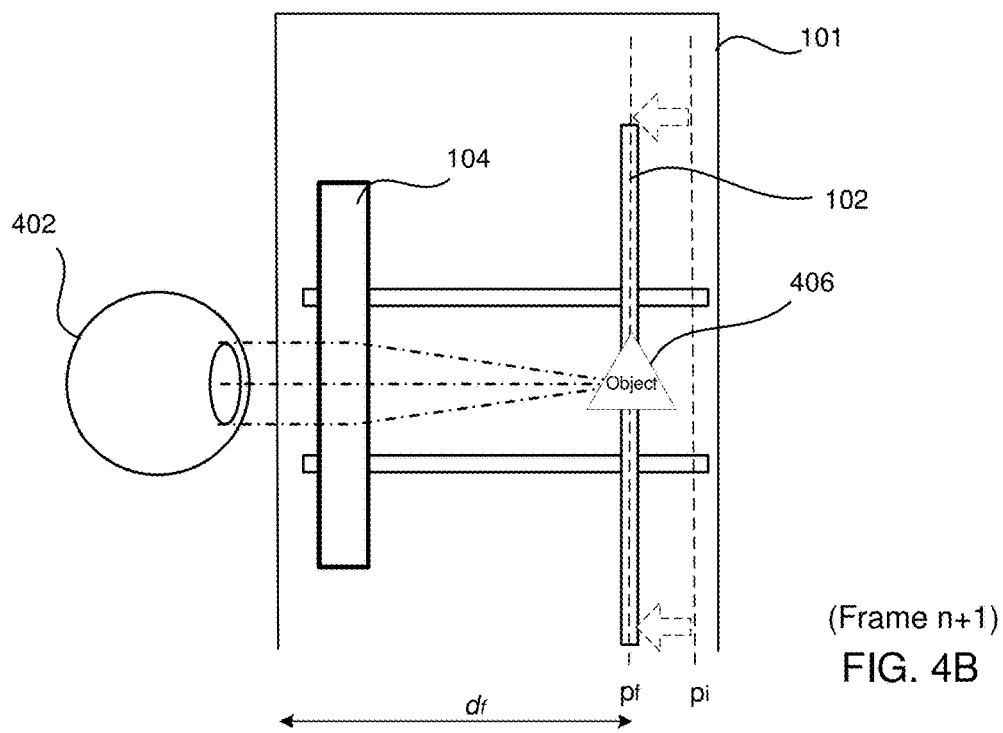

Accordingly, the focal distance is adjusted for the presented frame of the virtual scene to provide accommodation for the generated filtered vergence depth by moving one of electronic display 102 or optics block 104. FIGS. 4A and 4B show an example process for adjusting the focal distance by changing the distance between electronic display 102 and optics block 104 using varifocal actuation block 106. In the example of FIGS. 4A and 4B, varifocal actuation block 106 includes an actuator, motor, track, and so forth that will be further described with respect to FIGS. 5A-21B that allow electronic display 102, optics block 104, or both to move relative to each other to dynamically adjust the adjust the focal distance d.

FIG. 4A shows an example of HMD 101 providing focus adjustment for frame n of a scene. In this example, the scene includes object 400 displayed on electronic display 102 at which the gaze of user 402 is directed (i.e., verged). A virtual image of object 400 is located a virtual distance $d_i$ behind electronic display 102, from exit pupil 404. In the example of FIG. 4A, electronic display 102 is in position pi, which provides accommodation for distance $d_i$ to enable comfortable viewing of object 400.

FIG. 4B shows HMD 101 providing s focus adjustment for a subsequent frame n+1 of the virtual scene. In this example, user 402 may have repositioned its eyes to look at object 406 or object 406 quickly moved toward user 402 in the scene. As a result, the virtual image of object 406 is located close to electronic display 102. In response to the location of object 406 close to the electronic display 102, which is closer than object 400 in FIG. 4A), eyes of user 402 rotate inward to verge on object 406, causing vergence processing module 112 to determine a new vergence depth for frame n+1 and to provide the new vergence depth to varifocal actuation block 106. Based on the new vergence depth, varifocal actuation block 106 moves electronic display 102 from position $p_i$ to new position $p_f$ to accommodate user 402 at the new vergence depth $d_f$ for the closer object 406.

In one example, each state of optics block 104 corresponds to a combination of focal distance and eye position, provides accommodation for a range of vergence depths, and is associated with a specific position of optics block 104. Accordingly, vergence depths may be mapped to positions of optics block 104 and stored in a lookup table. Thus, when a vergence depth is received from vergence processing module 112, varifocal actuation block 106 automatically moves optics block 104 to a position corresponding to the received vergence depth based on the lookup table.

In many instances, virtual reality systems aim to present users with a virtual environment that closely simulates a real world environment or provides users with content causing the users to get lost in the illusion created by the virtual reality systems. To provide users with a realistic or captivating virtual environment, a virtual reality system implements multiple systems and methods discussed herein to operate together at efficiencies that are imperceptible to a user. For example, transition delays are particularly costly to user experience with virtual reality systems. If a user is waiting for the virtual scene presented by a HMD to catch up to what the user's brain is already expecting, the illusion is broken and/or the user may get nauseous. However, processing speeds and commercially available actuators are currently faster than the coordination of the human eye to change the shape of its lens and the human brain to register what the new shape of the lens is focused on, allowing the disclosed systems and methods to provide users with high-quality virtual environments.

The frame of the virtual scene corresponding to the portion of the virtual scene being viewed by the user is displayed on electronic display 102 with a distortion correction to correct optical error caused by the determined state of optics block 104 and with depth of field blur based on the vergence depth. Further, varifocal actuation block 106 has changed the focus of optics block 104 to provide focus and accommodation to the location in the portion of the virtual scene where the user's eyes are verged.

Display of a scene by HMD 101 is modified to mitigate distortion introduced by optical errors of optics block 104 included in HMD 101 that directs image light from electronic display element 102 presenting the scene to an eye of a user. A distortion correction is applied to the scene that pre-distorts the scene, and distortion caused by optics block 140 compensates for the pre-distortion as light from the modified scene passes through optics block 104. Hence, the scene viewed by the user is not distorted. Accordingly, distortion corrections account for different levels and types of distortion caused by different eye positions relative to optics block 104 or different focal distances of HMD 101. Accordingly, the distortion corresponding to different potential eye positions relative to optics block 104 and at potential focal distances for HMD 101 is determined by measuring a wavefront (i.e., propagation of points of the same phase) of light from the electronic display element after the light has passed through the optics block. Different eye positions relative to optics block 104 and different states of optics block 104 cause different degrees of optical error in light directed through optics block 104. This optical error distorts light from electronic display element 102 included in HMD 101, which may impair presentation of a virtual scene to a user. Accordingly, distortion correction maps are generated based on measurements of the wavefront for different states of optics block 104 to correct for optical error introduced by the different states of optics block 104, which accounts for different focal distances of HMD 101.

Varifocal Actuation

As described above, varifocal actuation block 106 enables dynamic adjustment of the focal distance of HMD 101 to keep a user's eyes in a zone of comfort as vergence and accommodation change. In one embodiment, varifocal actuation block 106 physically changes the distance between electronic display 102 and optical block 104 by moving electronic display 102 or optical block 104 (or both). Moving or translating two lenses that are part of optical block 104 relative to each other may also be used to change the focal distance of optics block 104 of HMD 101 to change the focal distance.

Figure 5A:
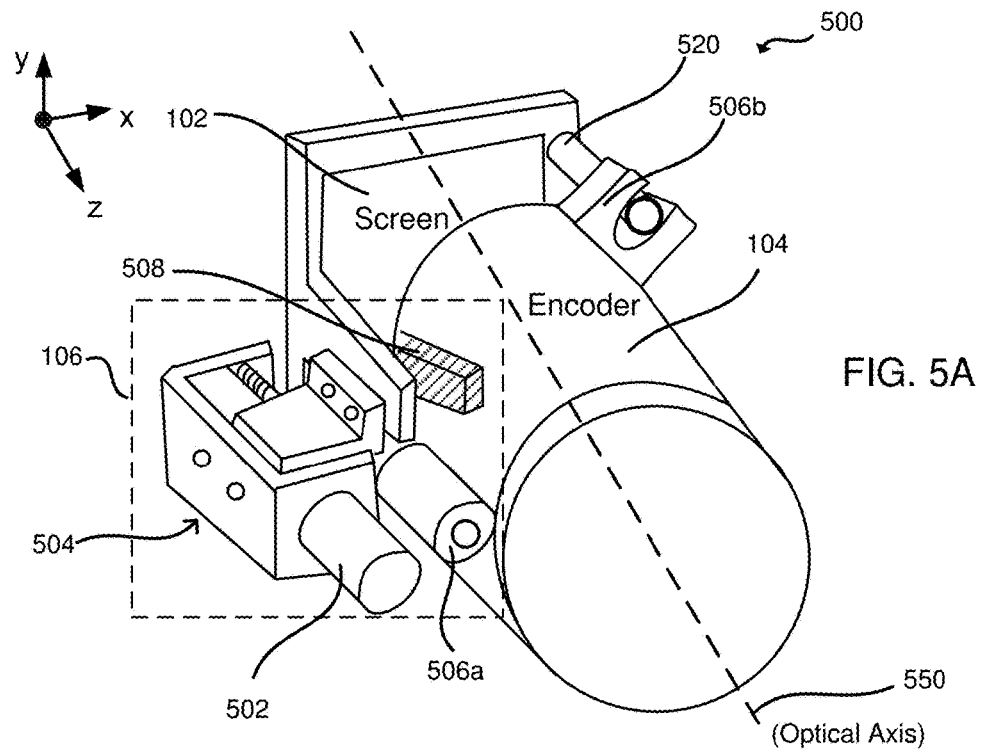
FIGS. 5A-5C show example portions of a head mounted display that includes a varifocal actuation block using a power screw, in various embodiments.
Figure 5B:
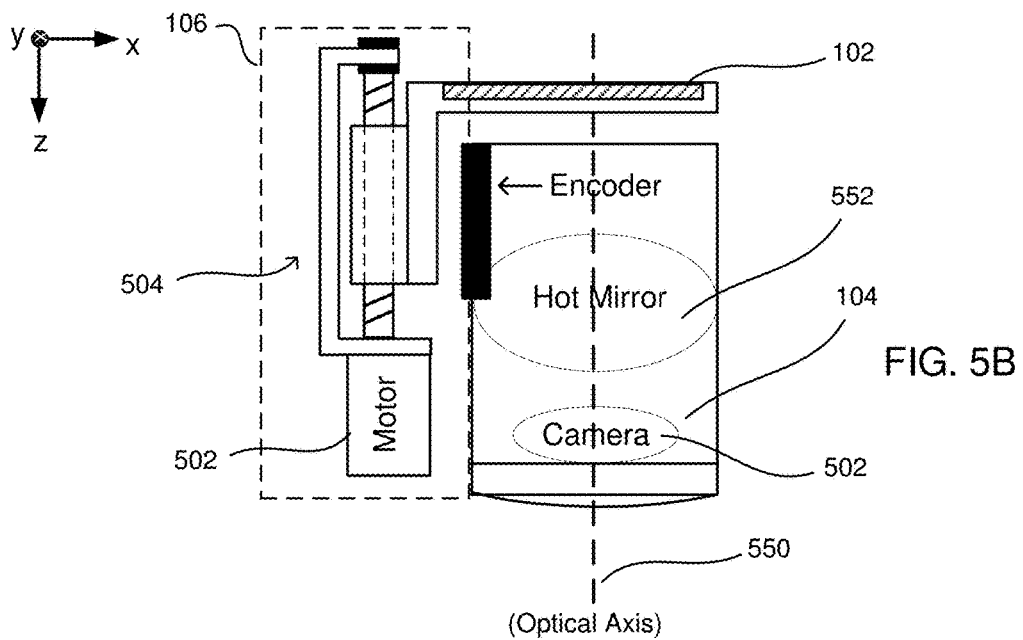
Figure 5C:
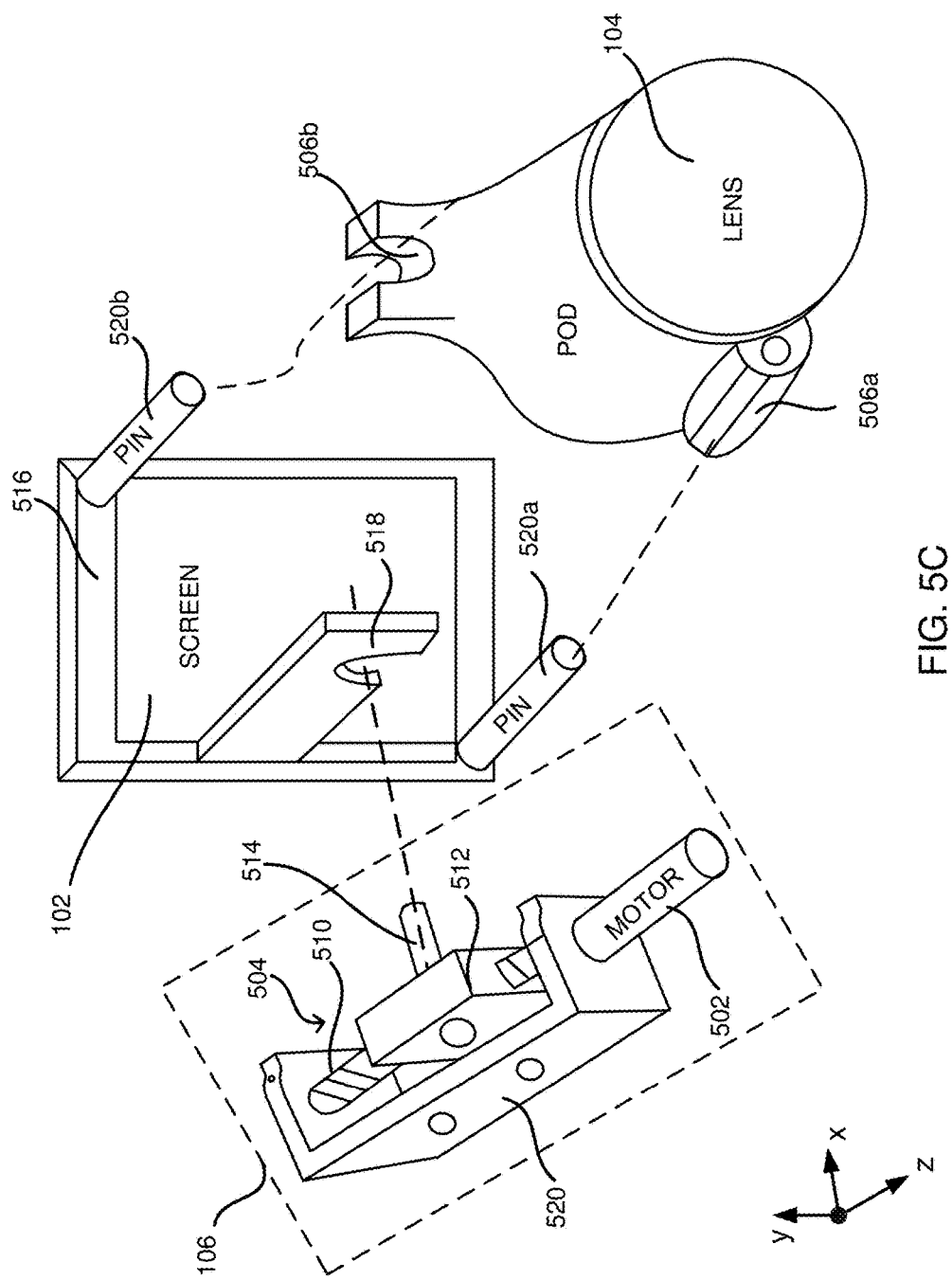

FIGS. 5A-5C show one implementation of varifocal actuation block 106 for a portion of one embodiment of HMD 101 corresponding to a single eye of a user that includes electronic display 102, optical block 104, and varifocal actuation block 106. Thus, as shown, HMD 101 would include two such portions of HMD 101 that would include two electronic displays 102, optical blocks 104, and varifocal actuation blocks 106; however, in other embodiments, HMD 101 may include a single electronic display 102 and a single varifocal actuation block 106. Additionally, other configurations of components described herein are possible.

FIG. 5A is a perspective view of a portion of HMD 101 that includes electronic display 102, optical block 104, and varifocal actuation block 106. Varifocal actuation block 106, in one embodiment, includes actuating motor 502 (e.g., DC brushed or brushless motor, stepper motor, etc.) and drive mechanism 504 (e.g., power screw, ball screw, geared spindle drive, etc.) fixed relative to optical block 104 (e.g., mounted directly to optics block 104, a housing of HMD 101, or a secondary bracket of HMD 101 etc.) to move electronic display 102 toward and away from optics block 104 along optical axis 550 (or z-axis) of via one or more guides 506.

FIG. 5B is a top view of the portion of HMD 101 shown in FIG. 5A that additionally shows camera 502 and hot mirror 552, in one embodiment of HMD 101. As described above, the position of electronic display 102, in this embodiment, is driven by (or adjusted in response to) the plane of focus corresponding to a vergence depth determined from the vergence angle of the user's eyes, as a function of real-time eye tracking. The position of each eye is captured by camera 302 which is located off-axis (i.e., at an angle relative to optical axis 550), in one embodiment. In this embodiment, camera 302 is an infrared (IR) camera that receives IR light reflected from the eye of the user via hot mirror 552 located between electronic display 102 and optics block 104. Hot mirror 552 is positioned at an angle relative to electronic display 102 in order to reflect the IR light off-axis toward camera 302. Here, hot mirror 552 is transparent to visible light to allow the visible light from electronic display 102 to pass through to a viewing user unimpeded while reflecting the IR light to camera 302. Thus, camera 302 captures IR light reflected from a retina of the user (and hot mirror 552) and this information for the position of the user's eye is provided to determine the vergence depth.

Accordingly, the focal distance of HMD 101 is adjusted to match the determined vergence depth. Drive mechanism 504, in substantially real-time, moves electronic display 102 relative to optics block 104 to focus HMD 101 to the determined vergence depth utilizing screen positioning feedback via linear or proximity encoder 508. In this implementation, a positional precision of ~100 microns or better is ideal and achievable with commercially available linear encoding systems.

FIG. 5C shows a blow-up view of the portion of HMD 101 described with respect to FIGS. 5A-5B. Here, components of electronic display 102, optical block 104, and varifocal actuation block 106 are shown separately with indications corresponding to how each of electronic display 102, optical block 104, and varifocal actuation block 106 fit together. Accordingly, drive mechanism 504 of varifocal actuation block 106 includes power screw 510 driven by motor 502 and nut-sled 512. Power screw 510 and motor 502 are supported by bracket 520, which can be fixed to a housing of HMD 101 or to optics block 104. Although shown outside of bracket 520, motor 502 could be located parallel to power screw 510 inside of bracket 520 and engage power screw 510 through gears located outside of bracket 520 (e.g., a first gear for motor 502 and a second gear for power screw 510). Nut-sled 512 includes push pin 514 and is threaded to move along power screw 510 when power screw 510 is turned and moves back and forth depending on which direction power screw 510 is turned. Additionally, a spring could be located between power screw 510 and bracket 520 or a spring with an integrated anti-backlash nut. Drive mechanism 504 may also use different screw types including a nut-sled interaction and screw end support methodologies.

In this implementation, optics block 104 is fixed within HMD 101 and electronic display 102 is moved relative to optics block 104 based on the determined vergence depth. Here, electronic display 102 is mounted to display bracket 516 that includes display bracket arm 518 and guide pins 520. Accordingly, display bracket arm 518 receives or engages push pin 514 of drive mechanism 504 and guide pins 520 slide freely within guides 506. Thus, as nut-sled 512 moves along power screw 510, push pin 514 engages display bracket arm 518 and moves display bracket 516 that supports electronic display 102, and guide pins 520 guide the movement of electronic display 102 relative to optics block by engaging guides 506 of optics block.

Figure 6A:
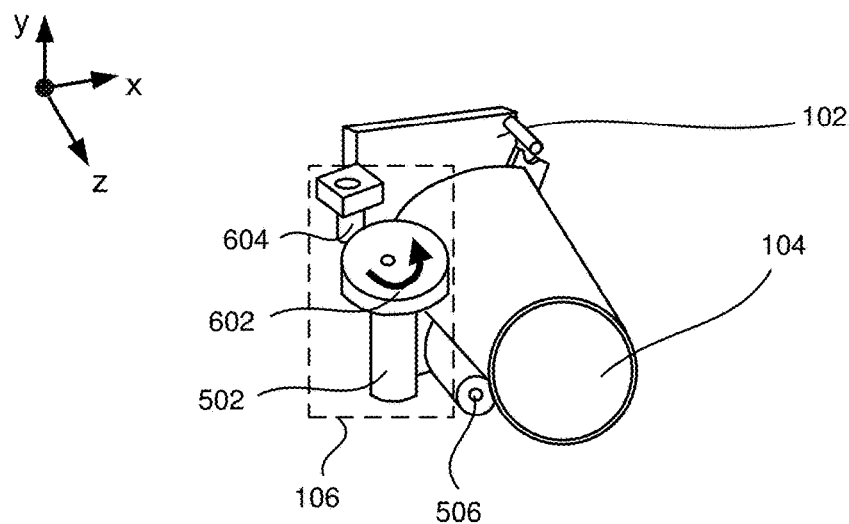
FIGS. 6A-6B show example portions of a head mounted display that includes a varifocal actuation block using a cam and roller, in various embodiments.
Figure 6B:
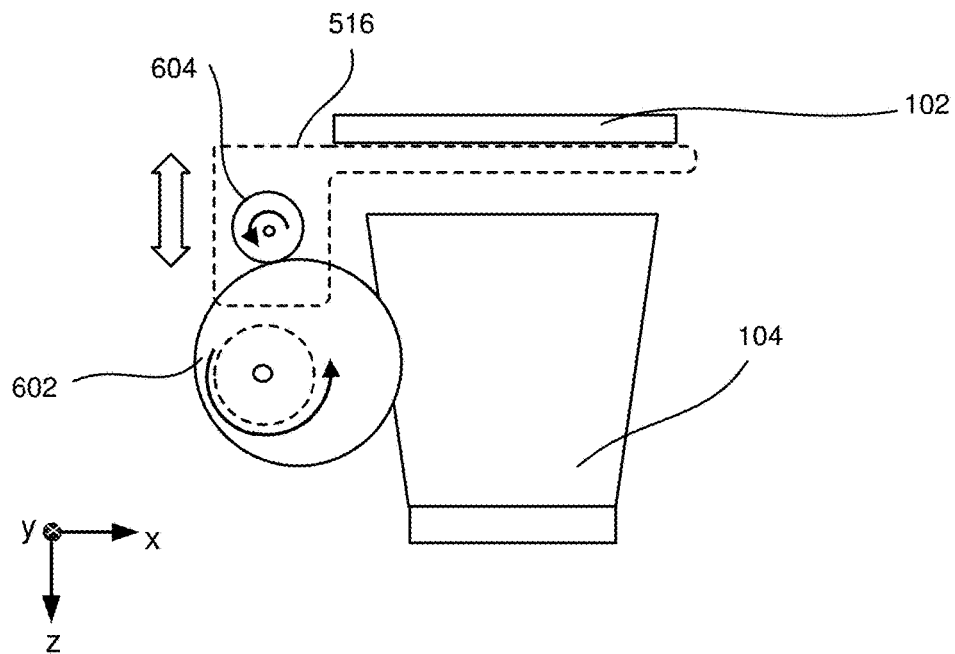

FIGS. 6A-6B shows another implementation of varifocal actuation block 106 for a portion of one embodiment of HMD 101 that uses cam and roller drive mechanism. FIG. 6A is a perspective view and FIG. 6B is a top view of a portion of HMD 101 that includes electronic display 102, optical block 104, and varifocal actuation block 106. Varifocal actuation block 106, in this embodiment, similarly includes actuating motor 502 (e.g., DC brushed or brushless motor, stepper motor, etc.) and drive mechanism that includes cam 602 connected to actuating motor 502 and roller 604 connected to display bracket 516 that engages cam 602 that move electronic display 102 toward and away from optics block 104 via one or more guides 506. In this implementation, the radius of cam 602 is not constant (e.g., an eccentric cam) and, as motor 502 turns cam 602, the changing radius of cam 602 moves electronic display 102 closer or farther away from optics block 104 depending on the direction cam 602 is turned.

Although shown positioned horizontally, cam 602 and roller 604 may alternatively be positioned vertically. Cam 602 and roller 604 may engage each other via gears or by sliding contact. Display bracket 516 may additionally be biased toward optics block 104 via one or more springs either between display bracket 516 and the housing of HMD 101 or along guide pins that engage guides 506. In another embodiment, roller 604 may not be necessary. For example, cam 602 could be an eccentric cam with a changing radius that directly engages an arm or extension of display bracket 516, such as in a sliding manner or via gear teeth. Thus, as cam 602 turns, the change in thickness of the radius of cam 602 sliding against display bracket 516 causes display bracket 516 to move either closer to or farther away from optics block 104 depending on which direction cam 602 is turned. In such an implementation, cam 602 may include a sliding perimeter bushing or bearing that may minimize friction against display bracket 516.

Figure 7:
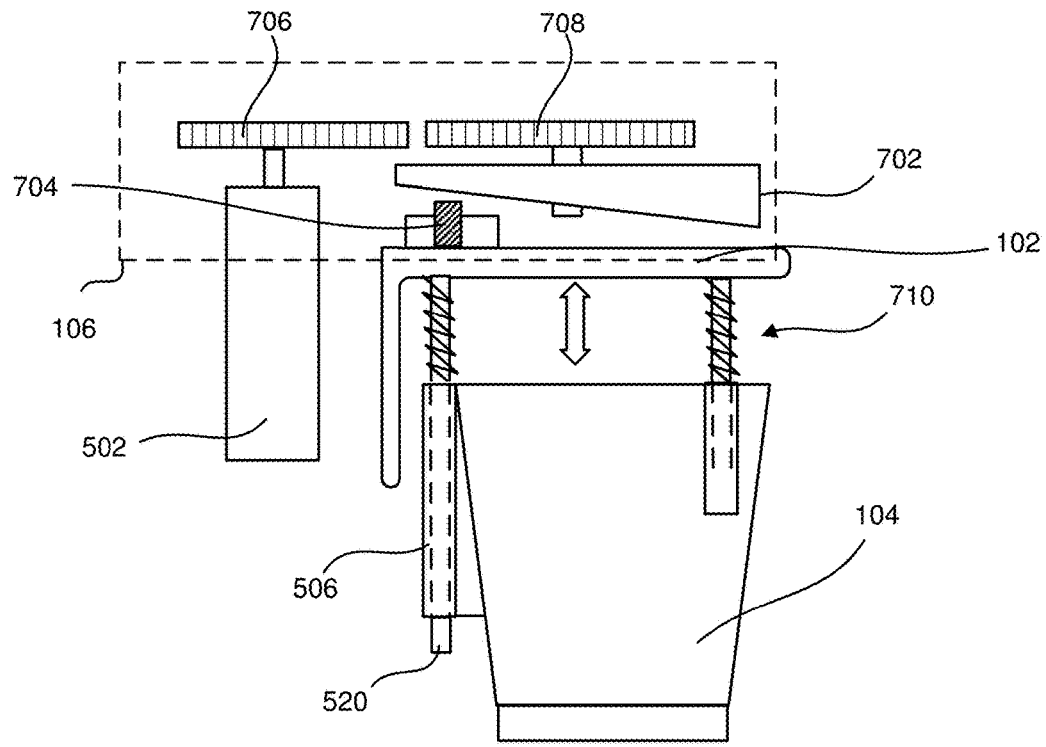
FIG. 7 shows an example portion of a head mounted display that includes a varifocal actuation block using a face cam of varying thickness that pushes against push contact roller to move the electronic display, in one embodiment.

FIG. 7 show another implementation of varifocal actuation block 106 that uses a face cam 702 of varying thickness that pushes against push contact roller 704 to move electronic display 102. Accordingly, motor 502 (e.g., DC brushed or brushless motor, stepper motor, etc.) is connected to first gear 706 that engages second gear 708 that is connected to face cam 702. Thus, in this implementation, electronic display 102 is biased away from optics block 104 via one or more springs 710 and, as motor 502 turns first gear 706, first gear 706 turns second gear 708, thereby turning face cam 702. As face cam 702 is turned, push contact roller 704 is pressed toward (or away from) optics block 104 based on the varying thickness of face cam 702 to move electronic display 102 relative to optics block 104. Other cam implementations are additionally achievable. For example, a cam and dual roller, a trapped Eccentric Cam inside of a larger cylindrical feature or whole created as part of display bracket 516, and pin in a spiral cam groove, a negative cut cam, and so forth.

Figure 8:
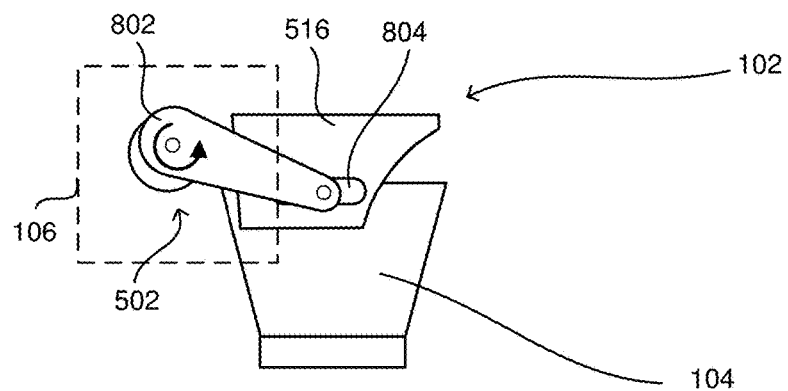
FIG. 8 shows an example portion of a head mounted display that includes a varifocal actuation block using a pivoting arm to move a display bracket supporting an electronic display, in one embodiment.

FIG. 8 shows another implementation of varifocal actuation block 106 that uses pivoting arm 802 to move display bracket 516 that supports electronic display 102. Accordingly, pivoting arm 802 that includes a pin engages drive slot 804 of display bracket 516 that supports electronic display 102. In this implementation, display bracket includes a top pivot arm 802 and a bottom pivot arm (not shown) supporting electronic display 102 between each pivot arm. In one embodiment, motor 502 includes a gear head that is provided off-axis, as shown in FIG. 8, but also includes a custom gear train through a shaft, for example, that links both pivoting arms for symmetric force application and movement of electronic display 102 in the z-direction.

FIGS. 9A-9C show implementations of varifocal actuation block 106 using a gear and rack. FIG. 9A utilizes rolling or sliding contact surfaces to induce translation of electronic display 102 in the z-direction and shows gear 902 driven by motor 502 which engages rack 904, which varies in thickness. In this implementation, the thickness of rack 904 increases with distance away from an end of rack 1304 that includes teeth that engage gear 1302. Here, display bracket 516 supporting electronic display 102 is biased away from optics block 104 via a spring. Thus, the thickest part of rack 904 would push display bracket 516 closer to optics block 104 relative to a least thick part of rack 904. Accordingly, in operation, motor 902 turns gear 902 which engages rack 904 to thereby move display bracket 516 forward or backward depending on a starting and stopping thickness of rack 904 exerting a force on display bracket 516. Thus, the varifocal actuation block 106, shown in FIG. 9A, is essentially a linear CAM, or sometimes referred to as a Wedge.

FIGS. 9B and 9C show other implementations of varifocal actuation block 106 using a gear and rack. In these implementations, the rack corresponds to arm 906 of display bracket 516 that is perpendicular to electronic display 102. FIG. 9B shows motor 902 directly connected to gear 902 that engages arm 906 (e.g., rack and pinion) to move electronic display 102. FIG. 9C shows worm gear 908 engaging gear 902 that engages arm 906 (e.g., rack and pinion with worm gear) to move electronic display 102.

Other implementations of varifocal actuation block 106 using a gear and rack are achievable. For example, in one implementation, the rack could be provided teeth upward and attached to display bracket 516. To offset a motor driven worm gear, a smaller spur gear that engages the teeth of the rack is attached to a worm spur gear of a larger radius for synchronous rotation. Thus, as the worm gear is turned by the motor, the worm gear turns the worm spur gear that synchronously turns the spur gear with a smaller radius, and the smaller spur engages the rack teeth, thereby, causing electronic display 102 to move either toward or away from optics block 104 depending on the direction of rotation of the worm gear. Moreover, worm gear 908, instead of engaging gear 902, could directly engage arm 906 to move electronic display 102.

FIGS. 10A-10D show implementations of varifocal actuation block 106 using a cable or belt drive and one or more pulleys. FIG. 10A shows varifocal actuation block 106 as a windup pulley actuator that includes first pulley 1002 connected to motor 502 (e.g., DC brushed or brushless motor, stepper motor, etc.), cable 1004, and idle tension pulley 1006. In this implementation, electronic display 102 is biased away from optics block 104 via one or more springs and first pulley 1002 pulls electronic display 102 toward optics block 104 via cable 1004 which is anchored to display bracket 516 supporting electronic display 102.

Alternatively, electronic display 102 is biased toward optics block 104 via one or more springs 1008 mounted to the housing of HMD 101, for example, and pulley 1002 pulls electric display 102 away optics block 104 via cable 1004, as shown in FIG. 10B. In this implementation, cable 1004 is anchored to display bracket 516 supporting electronic display 102 from behind and wrapped around via two idle tension pulleys 1006. Thus, motor 502 turns first pulley 1002 in one direction to compress springs 1008 and thereby moving electronic display away from optics block 104 and releases tension in springs 1008 by turning first pulley 1002 in the opposite direction. Using multiple idle tension pulleys 1006, first pulley 1002 can be located in many different locations.

FIG. 10C shows varifocal actuation block 106 as a belt drive actuator that includes first pulley 1002 connected to motor 502 and belt 1010 around first pulley 1002 and idle pulley 1006. In this implementation, bracket 1012 is fixed to belt 1010 and to arm 1014 of display bracket 516. Thus, as motor 502 turns first pulley 1002, belt 1010 moves electronic display 102 toward or away from optics block 104.

Further, FIG. 10D shows a friction drive wheel implementation of varifocal actuation block 106. In this example, friction drive plate 1016 is connected to arm 1014 of display bracket 516 and sandwiched between contact drive wheel 1018 and secondary support wheel 1020. Contact drive wheel 1018 is driven by motor 502 and frictionally engages friction drive plate 1016. Thus, as motor 502 turns contact drive wheel 1018, friction drive plate 1016 is driven back and forth in the z-direction to move electronic display 102 toward or away from optics block 104.

Figure 11:
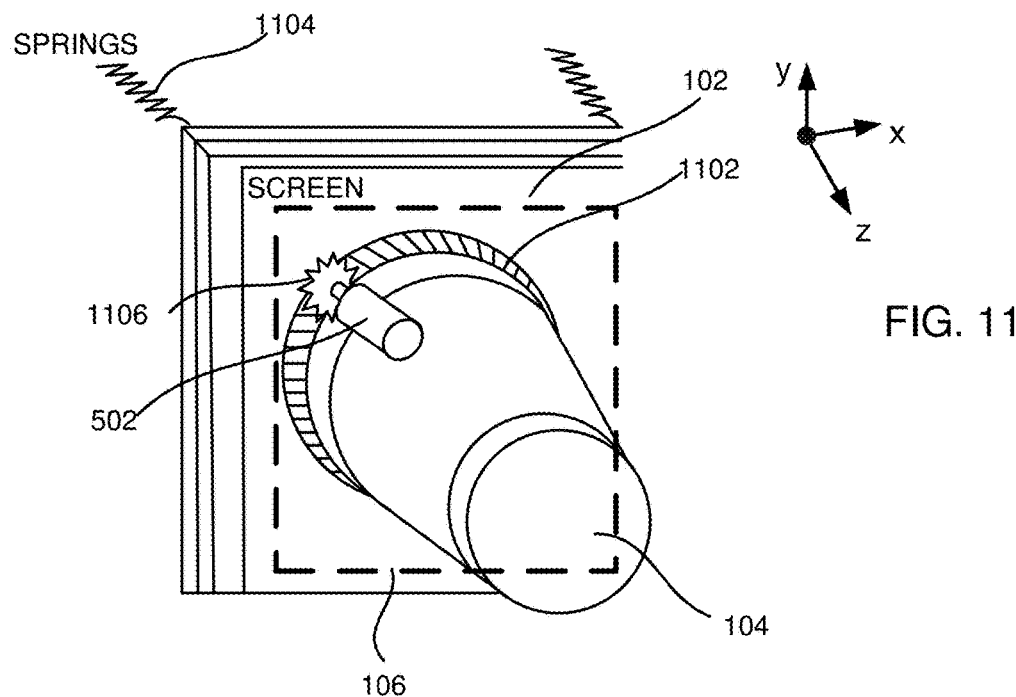
FIG. 11 shows an example portion of a head mounted display that includes a threaded ring that engages a threaded portion of an end of an optics block to telescopically move an electronic display, in one embodiment.

FIG. 11 shows another implementation of varifocal actuation block 106 where electronic display 102 is attached to threaded ring 1102 that engages a threaded portion of an end of optics block 104. Accordingly, threaded ring 1102 and electronic display 102 moves telescopically in the z-direction when threaded ring 1102 is turned via motor 502 and spur gear 1106. In this implementation, electronic display 102 is biased toward optics block 104 via springs 1104 and is pushed away from optics block 104 as motor 502 turns spur gear 1106.

Figure 12:
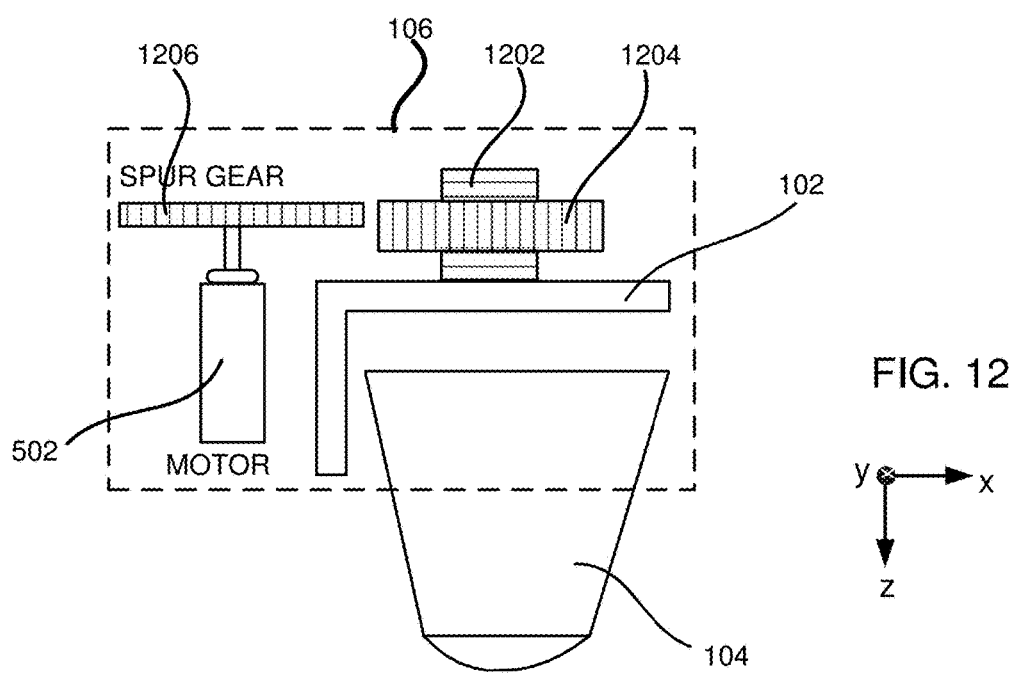
FIG. 12 shows an example portion of a head mounted display that includes a varifocal actuation block using a gear threaded actuator attached to a center of an electronic display to push the electronic display from behind, in one embodiment.

FIG. 12 shows an implementation of varifocal actuation block 106 where a gear threaded actuator is attached to a center of electronic display 102 pushes electronic display 102 from behind. Accordingly, electronic display 102 is attached to threaded post 1202 from behind. Exterior gear 1204 includes teeth on the exterior and is internally threaded to engage threaded post 1202. Spur gear 1206 is attached and turned by motor 502 and engages exterior gear 1604. Thus, as motor 502 turns spur gear 1206, spur gear 1206 turns exterior gear 1204 causing threaded post 1202 to move electronic display 102 back and forth relative to optics block 104 via the threaded engagement between threaded post 1202 and exterior gear 1204 depending on which direction motor 502 turns spur gear 1206. Alternatively, motor 502 could be mounted directly behind electronic display 102 with the threaded "nut" feature attached to the screen bracket, and the motor shaft rotating the threaded power screw to push it back and forth.

Figure 13A:
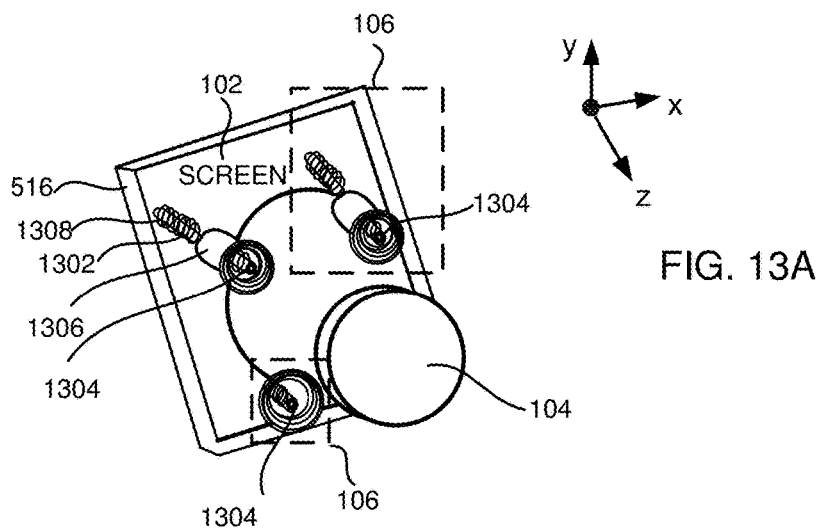
FIGS. 13A-13B show example portions of a head mounted display that includes a varifocal actuation block using a solenoid or Voice Coil Actuator (VCA) as a motor to drive movement of an electronic display, in various embodiment.
Figure 13B:
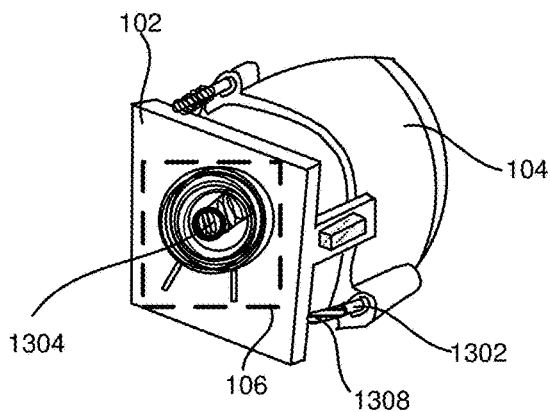
Figure 13C:
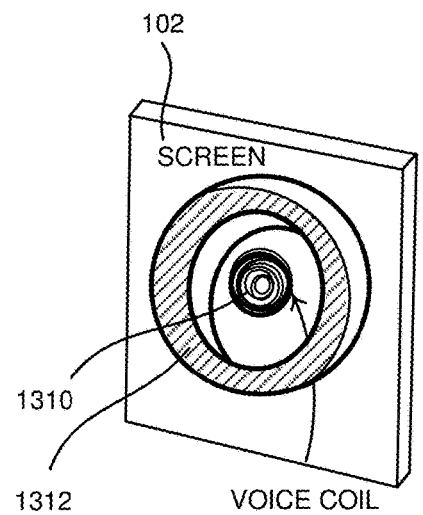
FIG. 13C shows an example portion of a head mounted display that includes a varifocal actuation block using a voice coil as a motor to drive movement of an electronic display, in one embodiment.

FIGS. 13A-13C show various implementations of varifocal actuation block 106 using a solenoid or Voice Coil Actuator (VCA) as a motor to drive movement of electronic display 102. FIG. 13A is a perspective view of an implementation that includes multiple varifocal actuation blocks 106 that each include voice coil 1304, guide 1306, and spring 1308 integrated together on each guide pin 1302 guiding or confining the direction of travel of electronic display 102 relative to optics block 104. Accordingly, in this implementation, guide pins 1302 are shown that each include a voice coil 1304 and spring 1308 and engage a guide 1306 of optics block 104 for movement in the z-direction.

In one embodiment, voice coil 1304 is a ferrite guide positioned between display bracket 516 supporting electronic display 102 and optics block 104. In this implementation, spring 1308 biases electronic screen 102 away from optics block 104 and, when actuated by allowing current to flow through the coil of voice coil 1304, the electromagnetic field created by the coil of voice coil 1304 attracts an iron core of voice coil 1304, causing spring 1308 to compress, and thereby moving electronic display 102 closer to optics block 104. When the coil is de-energized, the force applied by spring 1308 pushes the iron core voice coil 1304 back toward its original position, thereby moving electronic display 102 back away from optics block 104. The more current flowing through the coil of voice coil 1304, the stronger the electromagnetic field, the more each spring 1308 is compressed, and the closer electronic display 102 moves toward optics block 104. Accordingly, the more spring 1304 is compressed, the closer electronic display 102 is to optics block 104 in this implementation.

Although shown in FIG. 13A as multiple varifocal actuation blocks 106, a single varifocal actuation block 106 off-axis could alternatively be implemented. Additionally, a single varifocal actuation block 106 on-axis positioned in the center on a back side of electronic display 102 could be implemented. FIG. 13B shows voice coil 1304 mounted on the back of electronic display 102, in one embodiment. In this implementation, voice coil 1304 is back-mounted on the center of electronic display 102 on one end and to a housing of HMD 101 or other stationary bracket. Thus, when actuated by allowing current to flow through the coil of voice coil 1304, electronic display 102 moves closer to optics block 104 and, when de-energized, spring 1308 pushes electronic display 102 back away from optics block 104.

FIG. 13C shows a voice coil implementation, in one embodiment, of varifocal actuation blocks 106. In this implementation, voice coil 1310 is mounted on the back-center of electronic display 102 and includes magnet 1312. The other end voice coil 1310 is mounted or attached to a housing of HMD 101 or other stationary bracket. Accordingly, driving a current through voice coil 1310 produces a magnetic field that causes voice coil 1310 to move relative magnet 1312, thereby moving electronic display 102.

Figure 14:
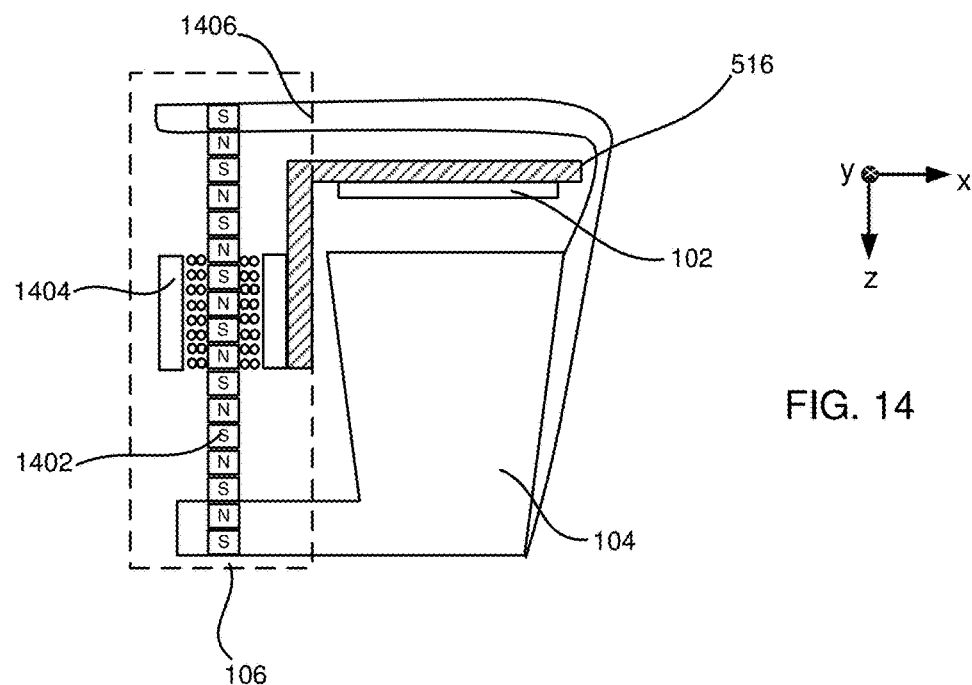
FIG. 14 shows an example portion of a head mounted display that includes a varifocal actuation block using alternating north-south poled shaft with solenoid-like driving coil, in one embodiment.

FIG. 14 shows an implementation of varifocal actuation block 106 that uses a linear motor. In one embodiment, the linear motor is an alternating north-south poled shaft with solenoid style driving coil. In this implementation, north-south poled shaft 1402 is attached to optics block 104 via bracket 1406 and drive coil 1404 that moves along north-south poled shaft 1402 is attached to display bracket 516. Accordingly, as a current is applied to drive coil 1404, drive coil will move along north-south poled shaft 1402 and, since electronic display 102 is attached to display bracket 516, the applied current moves electronic display 102 relative to optics block 104. Although shown attached to optics block 104 via bracket 1406, north-south poled shaft 1802 could alternatively be mounted to a housing of HMD 101 or some other bracket that is fixed relative to optics block 104. Thus, as drive coil 1804 moves along north-south poled shaft 1402, electronic display 102 will move relative to optics block 104 in a similar manner. In another embodiment, the linear motor could be a Linear Tube Servo, among other possibilities.

Figure 15A:
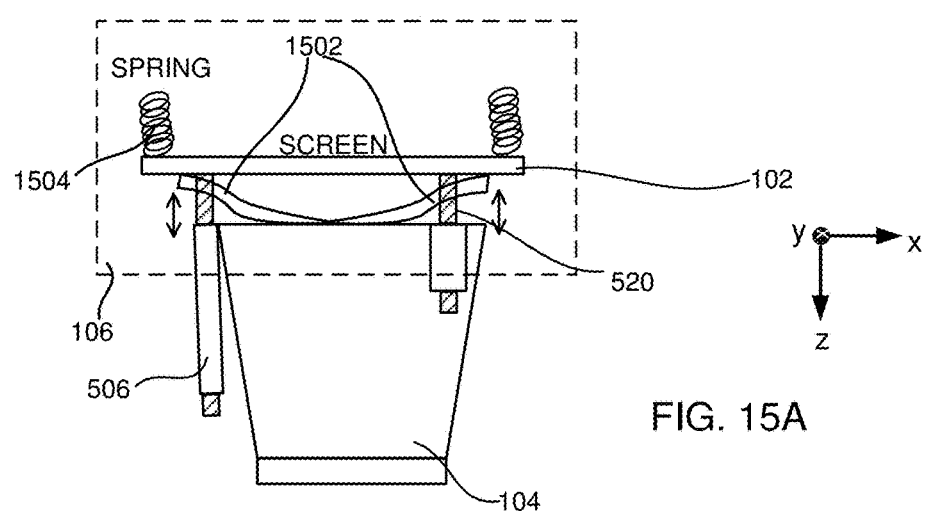
FIGS. 15A-15C shows an example portion of a head mounted display that includes a varifocal actuation block using Piezo bending and pneumatic actuation to move an electronic display, in various embodiments.

FIG. 15A shows an implementation of varifocal actuation block 106 that uses Piezo bending to move electronic display 102, in one embodiment. Piezo walking linear stages utilize rapid expansion and contraction characteristics of piezo element with applied voltage, to "walk" shaft in and out. Piezo bend use thin Piezo layers on a pre-loaded substrate to act as a return spring. In this implementation, FIG. 15A shows display bracket 516 that supports electronic display 102 movable relative optics block 104 via guide pins 520 of display bracket 516 and guides 506 of optics block 104. Display bracket 516 (and electronic display 102) is biased toward optics block 104 via springs 1504. Accordingly, Piezo layered substrate 1902 is located between electronic display 102 and optics block 104 to push electronic display 102 away from optics block 104 when a voltage is applied.

Although shown with springs 1504 anchored to a housing of HMD 101 or other bracket and Piezo layered substrate 1502 located between electronic display 102 and optics block 104, springs 1504 could alternatively be located between electronic display 102 and optics block 104 and Piezo layered substrate 1502 could be anchored to the housing of HMD 101 or other bracket and Piezo layered substrate 1502. Further, various implementations could make use of multiple Piezo layers stacked to amplify motion.

Figure 15B:
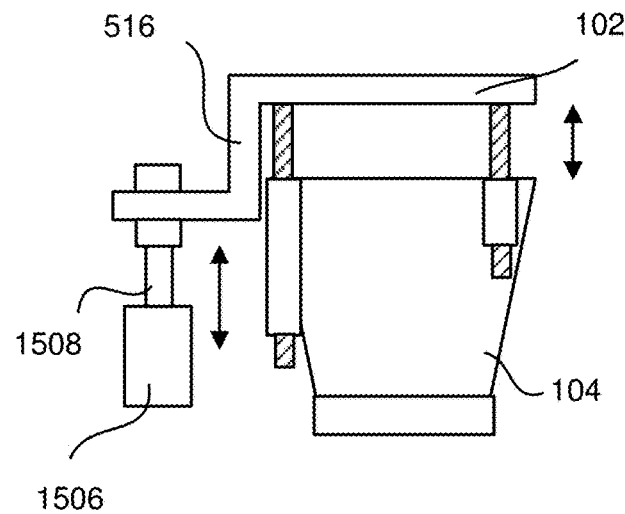
Figure 15C:
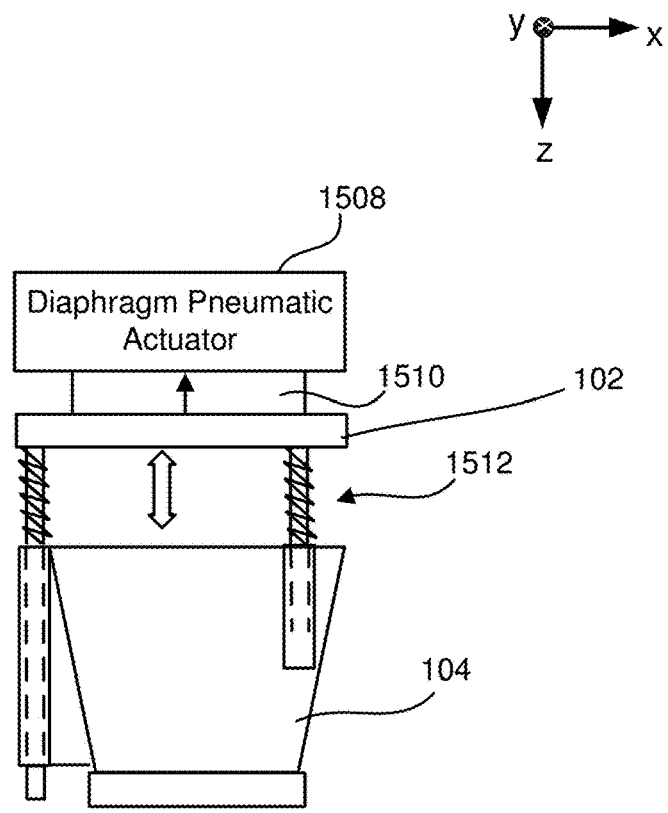

FIGS. 15B-15C show example pneumatic or hydraulic actuation implantations of varifocal actuation block 106 that uses a gas or liquid pressure to move one or more pistons or a diaphragm to move electronic display 102 relative to optics block 104. FIG. 15B shows piston 1506 and valve stem 1508 with valve stem 1508 attached to an arm of display bracket 516. Thus, as pressure forces valve stem 1508 of piston 1506 to move in the z-direction, electronic display 102 is moved away from optics block 104. Further, although not shown, electronic display 102 could be spring biased away from optics block 104. Alternatively, the actuator of FIG. 15B including piston 1506 and valve stem 1508 could be replaced with a Piezo linear motor, a Piezo Linear Ultrasonic drive, a Piezo inertia drive (e.g., stick slip drive), a Piezo Bender (e.g., a Piezo Bimorph), or a Piezo Strain Amplifier (Piezo Flexure Drive) to move electronic display 102 in the z-direction.

FIG. 15C shows diaphragm pneumatic or hydraulic actuator 1506 that includes diaphragm 1510. In this example, electronic display 102 is spring biased away from optics block 104 via springs 1512 and diaphragm 1510, when pressure is forced into diaphragm 1510, provides the motive power to move electronic display 102 against spring 1512 toward optics block 104.

Interpupillary Distance Adjustment

FIGS. 16A-16D show various implementations of varifocal actuation block 106 that allow for interpupillary distance (IPD) adjustment. Here, FIGS. 16A-16D are directed to implementations of the contact between varifocal actuation block 106 and display bracket 516 to allow the actuation system to be mounted fixed, to the housing, while permitting electronic display 102 and optics block 104 to translate on IPD rails.

Figures 16A, 16B:
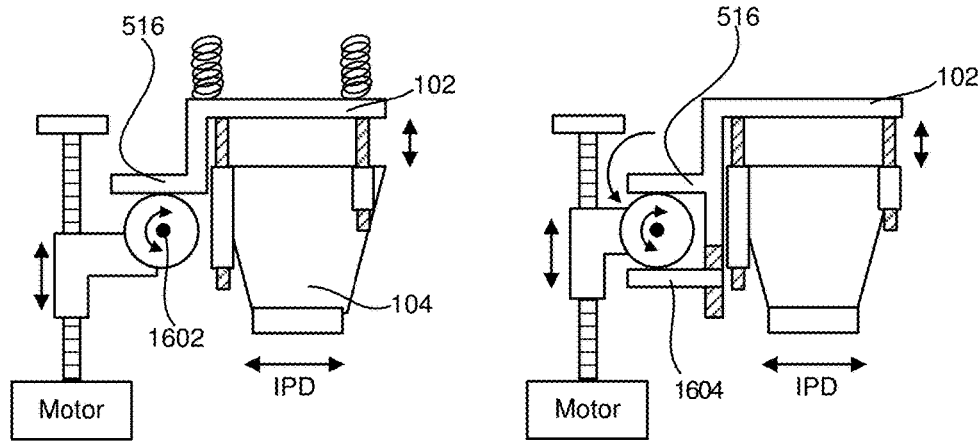
FIGS. 16A-16C shows an example portion of a head mounted display that includes a varifocal actuation block includes interpupillary distance adjustment, in various embodiments.

FIG. 16A shows an arm extension of display bracket 516 that allows rolling CAM or eccentric roller 1602 to push against display bracket 516 and thereby move electronic display 102 that is spring biased toward optics block 104. The arm extension of bracket display 516 allows for a larger or longer section of contact for roller 1602 to allow electronic display 102 and optics block 104 to move laterally (x-direction) relative to varifocal actuation block 106, thereby allowing a user to adjust the interpupillary distance of HMD 101 to fit their face.

Similarly, FIG. 16B shows another implementation including screw adjustable or spring biased contact back plate 1604 that engages roller 1602. FIG. 16B also includes an arm extension of display bracket 16 allows for a larger or longer section of contact for roller 1602 to allow lateral (x-direction) movement of electronic display 102 and optics block 104 relative to varifocal actuation block 106. In this example, however, electronic display 102 is not spring biased toward optics block 104 and nut-sled 512 is secured via roller 1602 (that allows the lateral adjustment) to display bracket 516 by adjustable contact back plate 1604.

Figures 16C, 16D:
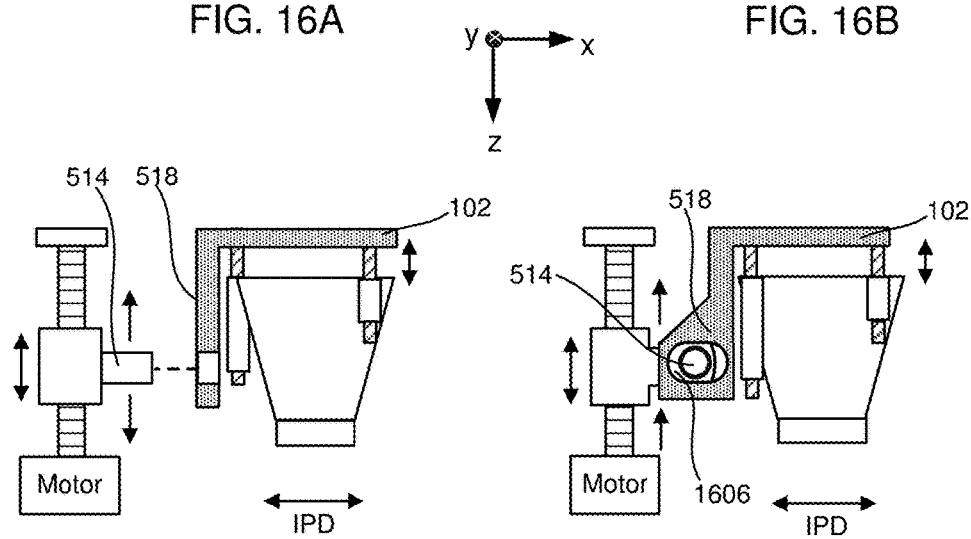

FIG. 16C-16D include push-pin 514 that attaches to bracket arm 518 of display bracket 516 that supports electronic display 102. Accordingly, FIG. 16C shows push-pin 514 provided horizontally (protruding in the x-direction) and capable of sliding back and forth within a hole provided for push-pin 514 in bracket arm 518 of display bracket 516. Push-pin 514 is provided at a length that allows push-pin 514 to engage bracket arm 518 at various lengths to allow electronic display 102 and optics block 104 to move laterally (x-direction) relative to varifocal actuation block 106, thereby allowing a user to adjust the interpupillary distance of HMD 101.

Similarly, FIG. 16D shows an implementation of varifocal actuation block 106 that includes push-pin 514 provided vertically (i.e., y-direction) via an extension of nut-sled 512. Push-pin 514, in this example, engages bracket arm 518 of display bracket 516 via slot 1606. Slot 1606 is elongated in the x-direction to allow lateral adjusts of electronic display 102 and optics block 104 relative to varifocal actuation block 106 by moving push-pin 514 back and forth (in the x-direction) within slot 1606 to similarly change the interpupillary distance.

Accordingly, the implementations of varifocal actuation block 106 shown FIGS. 16A-16D allow for interpupillary distance (IPD) adjustment while motor 502 is mounted to the housing of HMD 101. In other embodiments, motor 502 is mounted to the optics block 104, directly or via a secondary bracket. In this embodiment, motor 502 moves with optics block 104 as the IPD is adjusted.

Varifocal Guidance

FIG. 17A shows an example of flexure based guidance system using one or more flexures 1702. A Flexure based guidance system makes use of mechanical stress applied to a flexure that causes the flexure to move or change shape. Flexure based guidance is friction-free when compared to shaft/pin in bushing guidance, can potentially be implemented with fewer/cheaper parts, and may be integrated to molded plastic parts. Flexures 1702, as shown in FIG. 17A, add a linear spring force that can move electronic display 102 and could be designed to permit fairly strict single degree of freedom motion. For example, FIG. 17A shows flexure 1702 as a less strict leaf spring embodiment that may rely on the actuation system design to minimize tip-tilt and off axis slide.

FIGS. 17B and 17C show a side cut view and a perspective view, respectively, of varifocal actuation block 106 using a flexure guidance system. In this example, varifocal actuation block 106 includes a dual flexure guidance assembly with a first flexure 1702a, a second flexure 1702b, and actuator 1704 (e.g., a motor, a voice coil, etc.) connected to the back of electronic display 102. A bracket 1706 supports electronic display 102 (i.e., electronic display 102 is mounted to bracket 1706), actuator 1704, in this example, is mounted behind electronic display 102 in the center of bracket 1706, and first flexure 1702a and second flexure 1702b guide or constrain movement of bracket 1706 (and, therefore, electronic display 102) in the direction perpendicular to the plane of electronic display 102.

Figure 17E:
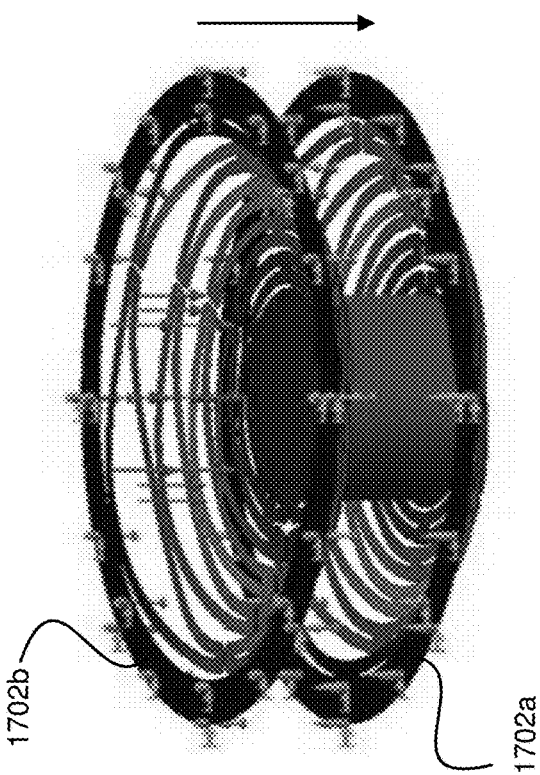
FIG. 17E shows a perspective view of a varifocal actuation block using the Flexure based guidance method of FIGS. 17B-17D in operation.
Figure 17D:
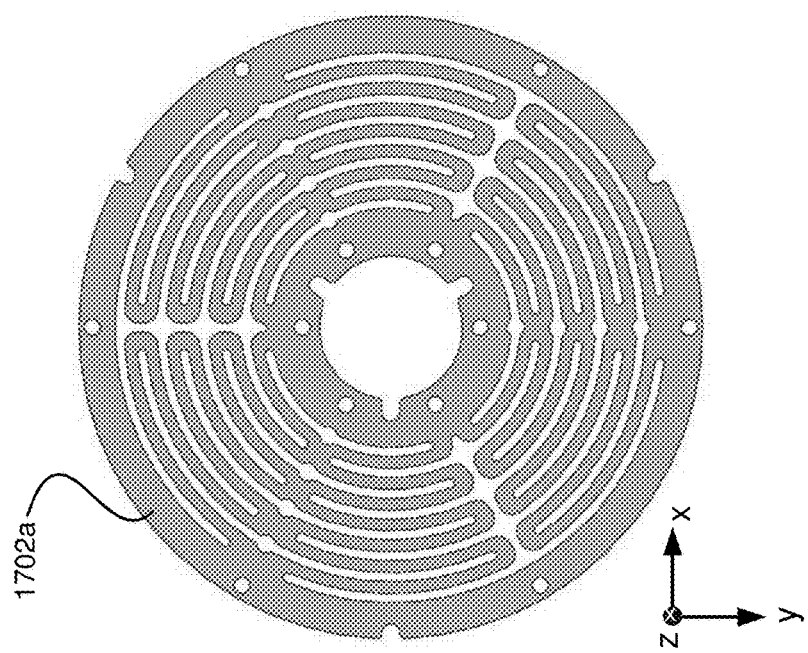
FIG. 17D shows an example Flexure that can be used to guide movement of an electronic display, in various embodiments.

In a rested state absent of any applied force, first flexure 1702a and second flexure 1702b are planar. FIG. 17D shows flexure 1702a (or 1702b) by itself, in one embodiment, and FIG. 17E shows a perspective view of varifocal actuation block 106 with the dual flexure guidance assembly that includes first flexure 1702a and second flexure 1702b in operation as actuator 1704 moves electronic display 102. Flexures 1702a and 1702b can be made from stainless steel, titanium, aluminum, a composite material, a plastic, an elastomer, and so forth and are planar or flat at rest, but are patterned (by etching, carving, etc.), as shown in the example of FIG. 17D, to guide movement in the z-direction.

In one embodiment, the pattern is designed to encourage or merely allow movement in the z-direction while resisting movement in the x or y-direction. In one embodiment, the pattern first flexure 1702a and second flexure 1702b operates a spring bias toward an equilibrium when each flexure is flat. The flexure(s) could also be married to actuator 1704 via the use of a "nut" and power screw to create a rotary style actuator. In another embodiment, the dual flexure guidance assembly that includes first flexure 1702a and second flexure 1702b could be provided with actuator 1704 located off to the side, as described and shown with respect to FIGS. 5A-5C.

Figure 18:
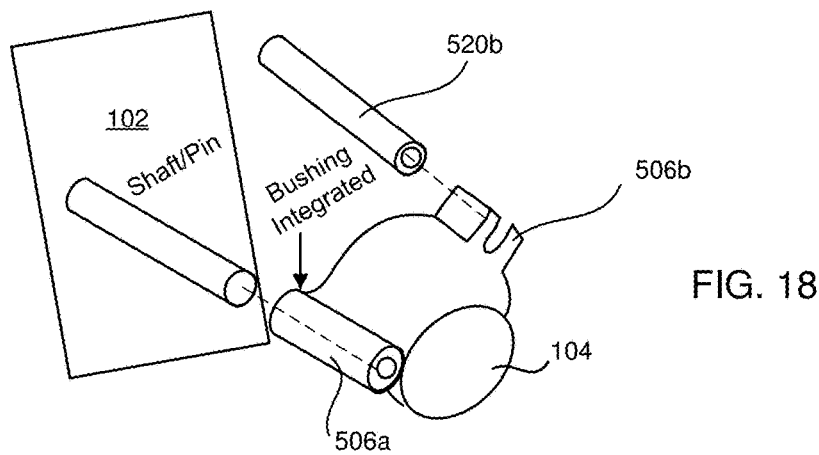
FIG. 18 shows an example portion of a head mounted display that includes a varifocal actuation block using a pin and shaft guidance method, in various embodiments.

FIG. 18 shows an example guidance method using Pin, Shaft, or shaft in bushings, linear bearings, or features. Combinations of a full radius bushing, and a C-shaped half bushing 506b may be used to not "over-constrain" a guidance system consisting of at least one guide pin 520 and guide 506a and C-shaped half bushing 506b of optics block 104. Here, guide pin 520 is fixed to (or apart of) screen bracket 516 and guide 506a and C-shaped half bushing 506b of optics block 104 constrain or guide motion of electronic display 102 via guide pin(s) 520 to allow movement in the z-direction. Other guiding features or methods may also be integrated into screen bracket 516, the housing of HMD 101, or optics block 104 directly. This guidance method could be used, for example, in conjunction with FIGS. 5A-6B. C-shaped half bushing 506b is only one of many possibilities that could be used in this category. For example, C-shaped half bushing 506b could be replaced with two full radius bushings, a full radius bushing and a v-slot bushing, two v-slot bushings, and forced bias applied via spring, screw, magnet, or flexure to any of the above configurations to one or both bushings, or one or both guide rods.

There are, in one embodiment, two guide pins 520a and 520b, one guide 506a, and one C-shaped half bushing 506b that the guide pins 520 fit into. One of the guide pins 520 is referred to as the Primary Guide (i.e., the guide pin that fits into guide 506a) because it does most of the guidance work including controlling the motion in all the degrees of freedom except for rotation, and the remaining axis of desired travel. The Primary Guide usually goes into one long bushing (e.g., guide 506a), or two separated along its axis to increase the span like a long bushing (same effect).

The other guide may be referred to as the Secondary Guide (e.g., guide pin 520), which only prevents the moving element from rotating around the Primary Guide. The C-shaped half bushing 506b for the primary guide can be shorter relative to guide 506a, and since it only controls rotation, the "Open-C" shape is best. Accordingly, in one embodiment, power screw 510 (leadscrew) itself could operate as the Primary Guide, thereby, obviating the need for guide pin 520a and guide 506a. Thus, nut-sled 512 acts as the Bushing, using the exterior surface of power screw 510 as its Primary Guide Rod and the secondary guide is the same C-shaped half bushing 506b.

Further, in one embodiment, the guide pins 520a and 520b could be mounted statically to optics block 104 and the guide 506a and C-shaped half bushing 506b could be mounted on screen bracket 516. It is also possible for a mixture, where the Primary Guide moves with electronic display 102 and the Secondary Guide is statically mounted to optics block 104, and a Secondary Bushing (e.g., C-shaped half bushing 506b) moves instead.

Figure 19B:
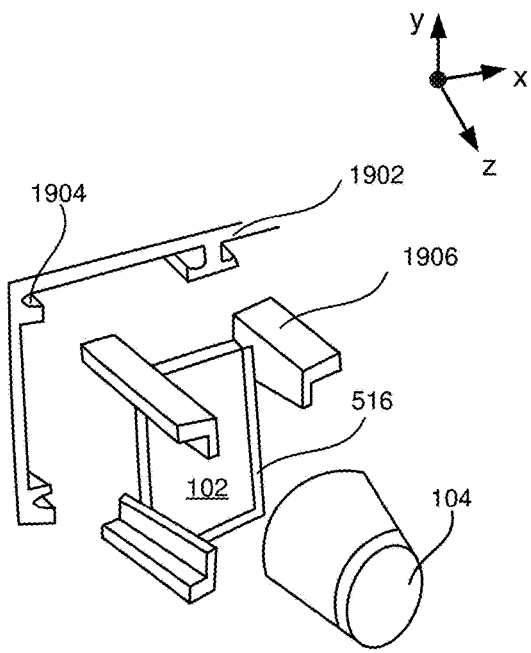
FIGS. 19A-19B shows an example portion of a head mounted display illustrating one guidance implementation for a varifocal actuation block, in various embodiments.
Figure 19A:
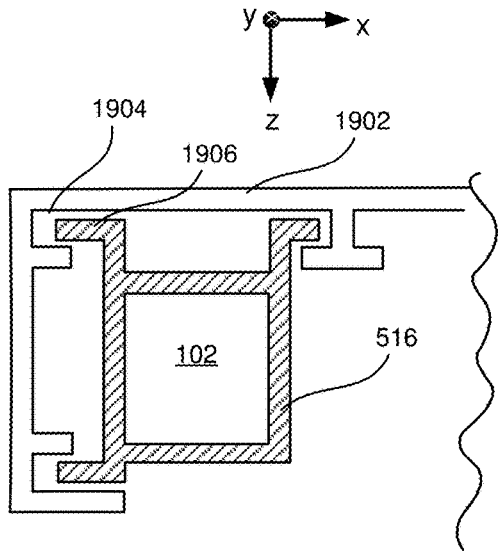

Further, guiding features could be integrated into display bracket 516, housing 1902 of HMD 101, or optics block 104 directly. FIG. 19A shows a perspective view of guidance channels 1904 with rectangular shaped edges designed to receive guide rails 1906 that are attached to display bracket 516. As above, guide rails 1906 fit into guidance channels 1904 to allow guide rails 1906 to move electronic display 102 back and forth in the z-direction relative to optics block 104, which is fixed, in this example, relative to housing 1902 of HMD 101. Similarly, FIG. 19B shows a side-cut view of guidance channels 1904 with rectangular shaped edges designed to receive guide rails 1906 attached to display bracket 516. Features may be designed to offer spring compliance or to remove any fit clearance, for example.

Instead of, or in addition to features or guide pins, pivoting linkages could be used to constrain or guide motion of electronic display 102 relative to optics block 104, in various embodiments. FIG. 20 shows scissor linkage 2002 that constrain or guide motion of electronic display 102 in the z-direction (i.e., optical axis). Here, there are two scissor linkages 2002; a first scissor linkage that expands horizontally (along x-axis) when compressed and a second linkage that expands vertically (along y-axis) when compressed to steady movement in the z-direction. One end of each scissor linkage 2002 connects to display bracket 516 and another end is connected to optics block 104.

Similarly, FIGS. 21A-21B show a Sarrus linkage guidance implementation. FIG. 21A shows compressed state of a Sarrus linkage used to constrain or guide motion of electronic display 102 relative to optics block 104, in one embodiment. In this implementation, the Sarrus linkage includes two individual linkages 2100 each composed of two rectangular plates (2102a, 2102b) with hinge 2104 connecting each rectangular plate (2102a, 2102b) of the individual linkages.

Accordingly, FIG. 21B shows an expanded state of a Sarrus linkage, in one embodiment. Here, each hinge 2104 from its position shown in FIG. 21A and together with its respective rectangular plates (2102a, 2102b) makes a circular arc motion that produces linear movement in the z direction. Thus, each individual linkage 2100 expands (one horizontally along x-axis when compressed and the other vertically along y-axis when compressed) to steady movement of electronic display 102 in the z-direction.

Additionally, the screen flex cable may be modified or redesigned to include a region intended for repeated flexing as electronic display 102 repeatedly moves back and forth. This could be as simple as making part of it longer, or making the cable two piece. The second piece could be non-flex style, more like a traditional "round" cable. Strain relief will be used to protect cable, and isolate IPD from Varifocal flexing portions.

ADDITIONAL CONFIGURATION INFORMATION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:
1. A varifocal actuation block comprising:
  a motor;
  a power screw coupled to the motor and configured to turn in response to actuation of the motor;
  a nut sled on the power screw coupled to an electronic display screen of a head mounted display (HMD), the nut sled configured to move back and forth along a length of the power screw in response to the power screw being turned by the motor resulting in movement of an electronic display screen relative to an optics block of the HMD, wherein movement of the electronic display screen relative to the optics block changes a focal length of the optics block; and
  an encoder configured to:
    receive an input corresponding to a focal length for a frame of a virtual scene being presented on the electronic display screen;
    determine a position for the electronic display screen relative to the optics block to achieve the focal length; and provide the motor with an instruction causing the electronic display screen to move relative to the optics block to achieve the focal length for the frame of the virtual scene.

2. The HMD of claim 1, wherein the varifocal actuation block further comprises:
one or more guide pins guiding movement of the electronic display screen relative to the optics block along the optical axis of the optics block.

3. The HMD of claim 2, wherein the power screw operates as a primary guide for movement of the electronic display screen relative to the optics block and the one or more guide pins operate as a secondary guide used to prevent rotation of the electronic display screen about the optical axis.

4. The varifocal actuation block of claim 1, further comprising:
a bracket holding the motor and the power screw mounted to a housing of the HMD, wherein the nut sled on the power screw coupled to the electronic display screen moves the electronic display screen relative to the optics block to change the focal length for a user viewing content displayed on the electronic display screen at an exit pupil of the HMD.

5. A head mounted display (HMD) comprising:
at least one processor;
an electronic display screen configured to display a virtual scene to a user wearing the HMD;
a optics block comprising one or more lenses configured to focus light from the electronic display screen to an exit pupil of the HMD;
an eye tracking system configured to determine an eye position of the user, the eye tracking system comprising:
an infrared camera; and
a hot mirror configured to reflect infrared light from an eye of the user wearing the HMD to the infrared camera;
a varifocal actuation block configured to change a focal length of the optics block based on the eye position of the user, the varifocal actuation block comprising:
an actuating motor;
a power screw coupled to the actuating motor and configured to turn in response to actuation of the actuating motor; and
a nut sled on the power screw and coupled to the electronic display screen, the nut sled configured to move back and forth along a length of the power screw in response to the power screw being turned by the actuating motor resulting in movement of the electronic display screen relative to the optics block; and
an encoder in communication with the eye tracking system and the varifocal actuation block, the encoder configured to:
receive the eye position determined by the eye tracking system;
determine the focal length of the optics block that provides focus for the eye position; and
provide an instruction to the varifocal actuation block to move the electronic display screen to a position providing focus for the eye position determined by the eye tracking system.

6. The HMD of claim 5, wherein the varifocal actuation block moves the electronic display screen relative to the optics block along an optical axis of the optics block.

7. The HMD of claim 5, wherein the varifocal actuation block further comprises:
one or more guide pins guiding movement of the electronic display screen relative to the optics block along the optical axis of the optics block.

8. The HMD of claim 7, wherein the one or more guide pins are attached to the electronic display screen, a male end of each guide pin coupling with a female end of the guide pin fixed to the optics block.

9. The HMD of claim 7, wherein the one or more guide pins are attached to the optics block, a male end of each guide pin coupling with a female end of the guide pin fixed to the electronic display screen.

10. The HMD of claim 7, wherein the power screw operates as a primary guide for movement of the electronic display screen relative to the optics block and the one or more guide pins operate as a secondary guide used to prevent rotation of the electronic display screen about the optical axis.

11. The HMD of claim 5, wherein the varifocal actuation block further comprises:
a bracket holding the motor and the power screw mounted to a housing of the HMD, wherein the nut sled on the power screw coupled to the electronic display screen moves the electronic display screen relative to the optics block to change the focal length for a user viewing content displayed on the electronic display screen at an exit pupil of the HMD.

12. The HMD of claim 5, wherein the hot mirror is positioned to reflect the infrared light from the eye of the user wearing the HMD to the infrared camera, wherein the hot mirror is transparent to visible light allowing the light from electronic display to pass through to the user unimpeded while reflecting the IR light to infrared camera.

13. A head mounted display (HMD) comprising:
at least one processor;
an electronic display screen configured to display a virtual scene to a user wearing the HMD;
a optics block comprising one or more lenses configured to focus light from the electronic display screen to an exit pupil of the HMD;
a varifocal actuation block configured to change a focal length of the optics block based on the eye position of the user, the varifocal actuation block comprising:
an actuating motor;
a drive mechanism coupled to the actuating motor; and
a sled on the drive mechanism coupled to the electronic display screen, the sled configured to move back and forth along a length of the drive mechanism in response to actuation by the actuating motor resulting in movement of the electronic display screen relative to the optics block; and
an encoder in communication with the varifocal actuation block, the encoder configured to determine a focal length of the optics block for the virtual scene and provide an instruction to the varifocal actuation block to move the electronic display screen to a position providing focus for the determined focal length.

14. The HMD of claim 13, wherein the drive mechanism is a power screw, a ball screw, or geared spindle drive.

15. The HMD of claim 13, wherein varifocal actuation block further comprises:
one or more guide pins guiding movement of the electronic display screen relative to the optics block along the optical axis of the optics block via the one or more guide pins.

16. The HMD of claim 15, wherein the one or more guide pins are attached to the electronic display screen, a male end of each guide pin coupling with a female end of the guide pin fixed to the optics block.

17. The HMD of claim 15, wherein the one or more guide pins are attached to the optics block, a male end of each guide pin coupling with a female end of the guide pin fixed to the electronic display screen.

18. The HMD of claim 15, wherein the power screw operates as a primary guide for movement of the electronic display screen relative to the optics block and the one or more guide pins operate as a secondary guide used to prevent rotation of the electronic display screen about the optical axis.

19. The HMD of claim 13, wherein the varifocal actuation block further comprises:
- a bracket holding the motor and the power screw mounted to a housing of the HMD, wherein the nut sled on the power screw coupled to the electronic display screen moves the electronic display screen relative to the optics block to change the focal length for a user viewing content displayed on the electronic display screen at an exit pupil of the HMD.

\* \* \* \* \*

UNITED STATES PATENT AND TRADEMARK OFFICE
CERTIFICATE OF CORRECTION

PATENT NO. : 10,610,775 B1
APPLICATION NO. : 15/862456
DATED : April 7, 2020
INVENTOR(S) : Ryan Michael Ebert et al.

Page 1 of 1

It is certified that error appears in the above-identified patent and that said Letters Patent is hereby corrected as shown below:

In the Claims

Column 23, Line 5, Claim 2, delete "HMD" and insert -- varifocal actuation block --.

Column 23, Line 10, Claim 3, delete "HMD" and insert -- varifocal actuation block --.

Signed and Sealed this
Third Day of November, 2020

Andrei Iancu
*Director of the United States Patent and Trademark Office*